United States Patent
Hokuto

(10) Patent No.: US 9,816,415 B2
(45) Date of Patent: Nov. 14, 2017

(54) CONTROL APPARATUS FOR AN INTERNAL COMBUSTION ENGINE

(71) Applicant: TOYOTA JIDOSHA KABUSHIKI KAISHA, Toyota-shi, Aichi-ken (JP)

(72) Inventor: Hiroyuki Hokuto, Numazu (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 49 days.

(21) Appl. No.: 15/024,494

(22) PCT Filed: Sep. 24, 2014

(86) PCT No.: PCT/JP2014/004888
§ 371 (c)(1),
(2) Date: Mar. 24, 2016

(87) PCT Pub. No.: WO2015/045378
PCT Pub. Date: Apr. 2, 2015

(65) Prior Publication Data
US 2016/0230628 A1 Aug. 11, 2016

(30) Foreign Application Priority Data

Sep. 25, 2013 (JP) ................................ 2013-198525
Sep. 11, 2014 (JP) ................................ 2014-185208

(51) Int. Cl.
*F01N 3/00* (2006.01)
*F01N 3/10* (2006.01)
(Continued)

(52) U.S. Cl.
CPC ......... *F01N 3/0885* (2013.01); *F01N 3/0814* (2013.01); *F01N 3/0842* (2013.01);
(Continued)

(58) Field of Classification Search
CPC .... F01N 3/0814; F01N 3/0842; F01N 3/0885; F01N 3/2066; F01N 2550/02;
(Continued)

(56) References Cited

U.S. PATENT DOCUMENTS

| | | | |
|---|---|---|---|
| 7,520,274 B2* | 4/2009 | Sawada | F01N 3/0814 123/672 |
| 2006/0242945 A1* | 11/2006 | Wang | F01N 3/0821 60/277 |

(Continued)

FOREIGN PATENT DOCUMENTS

| | | |
|---|---|---|
| JP | H07-180535 A | 7/1995 |
| JP | H07-208151 A | 8/1995 |

(Continued)

*Primary Examiner* — Audrey K Bradley
*Assistant Examiner* — Diem Tran
(74) *Attorney, Agent, or Firm* — Andrews Kurth Kenyon LLP

(57) ABSTRACT

In a control apparatus for an internal combustion engine in which processing of regenerating the NOx storage capacity of an NSR catalyst is carried out in accompany with processing of diagnosing an abnormality in an exhaust gas purification device including the NSR catalyst, the present invention is intended to suppress the fluctuation of torque at the time of regenerating the NOx storage capacity of the NSR catalyst, and to terminate abnormality diagnostic processing quickly. According to the invention, by setting an engine air fuel ratio, which has been set to a lean air fuel ratio before the processing of regenerating the NOx storage capacity of the NSR catalyst is started, to a weak lean air fuel ratio which is lower than a basic lean air fuel ratio and higher than a stoichiometric air fuel ratio, it becomes possible to suppress the fluctuation of torque at the time of regeneration processing being started, and to terminate abnormality diagnostic processing at an early period of time.

12 Claims, 18 Drawing Sheets

(51) Int. Cl.
  *F01N 3/08* (2006.01)
  *F02D 41/02* (2006.01)
  *F01N 11/00* (2006.01)
  *F02D 41/14* (2006.01)
  *F01N 3/20* (2006.01)

(52) U.S. Cl.
  CPC ............ *F01N 3/2066* (2013.01); *F01N 11/00* (2013.01); *F02D 41/0275* (2013.01); *F02D 41/1463* (2013.01); F01N 2550/02 (2013.01); F01N 2550/03 (2013.01); F01N 2560/026 (2013.01); F01N 2900/0416 (2013.01); F01N 2900/1614 (2013.01); Y02T 10/24 (2013.01); Y02T 10/47 (2013.01)

(58) Field of Classification Search
  CPC ........... F01N 2550/03; F01N 2560/026; F01N 2900/0416; F01N 2900/1614; F01N 11/00; F02D 41/0275; F02D 41/1463; Y02T 10/24; Y02T 10/47
  USPC .......................... 60/277, 285, 295, 297, 301
  See application file for complete search history.

(56) References Cited

U.S. PATENT DOCUMENTS

| 2010/0024520 | A1* | 2/2010 | Sawada | B01D 53/9409 73/23.31 |
| 2010/0083637 | A1* | 4/2010 | Sawada | B01D 53/90 60/277 |

FOREIGN PATENT DOCUMENTS

| JP | H09-184438 A | 7/1997 |
| JP | 2001-271697 A | 10/2001 |
| JP | 2013-092055 A | 5/2013 |

* cited by examiner

[Fig. 1]
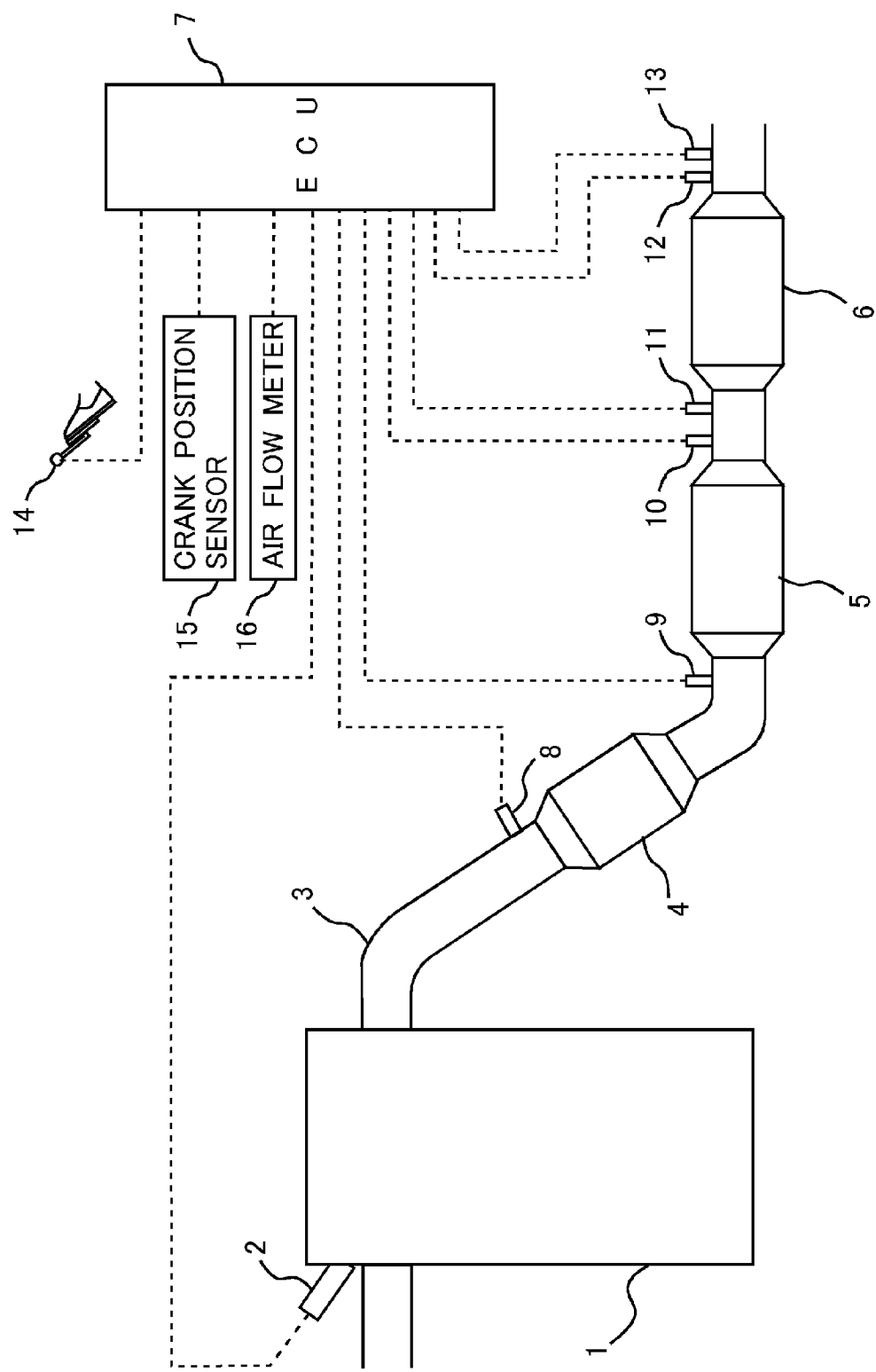

[Fig. 2]
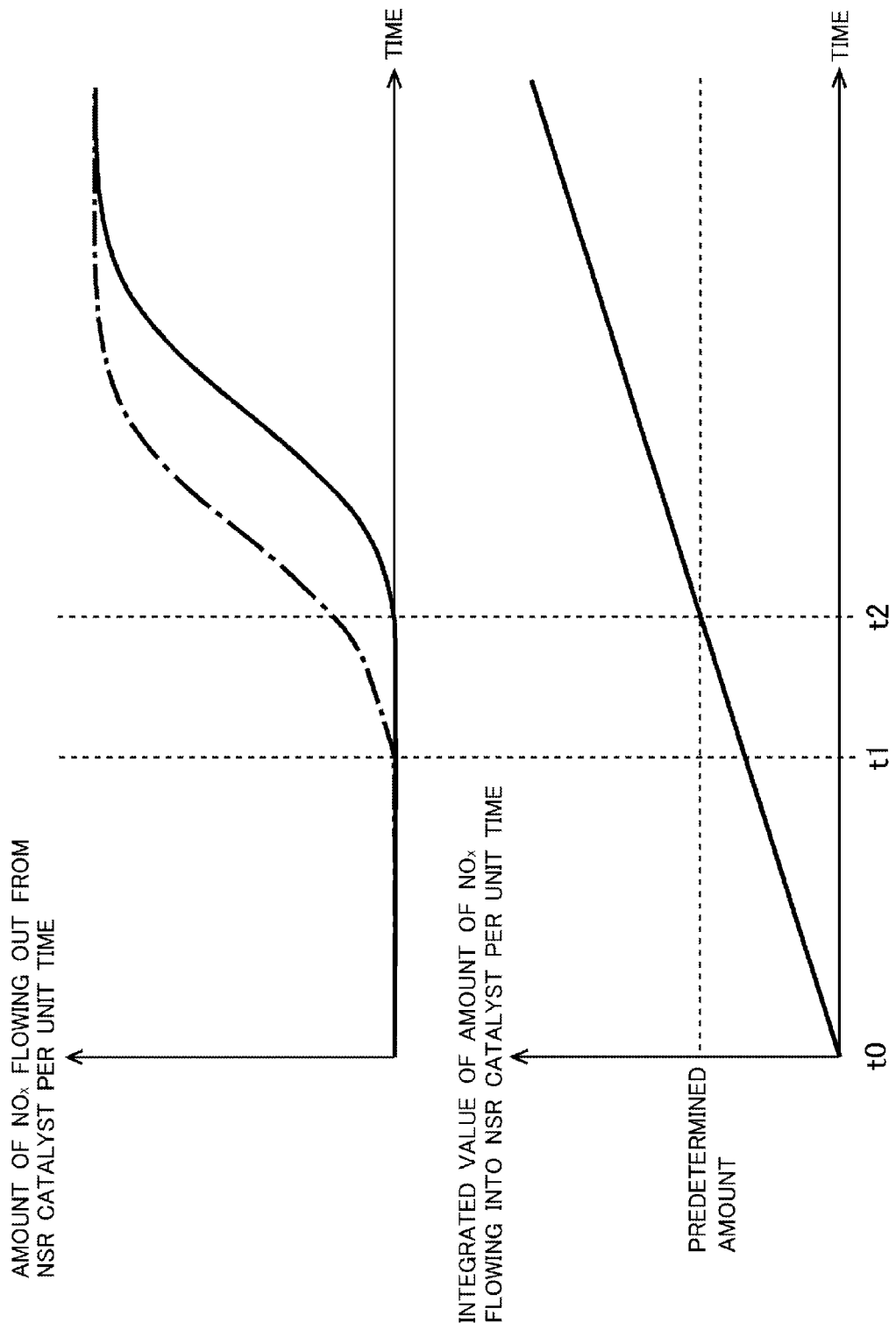

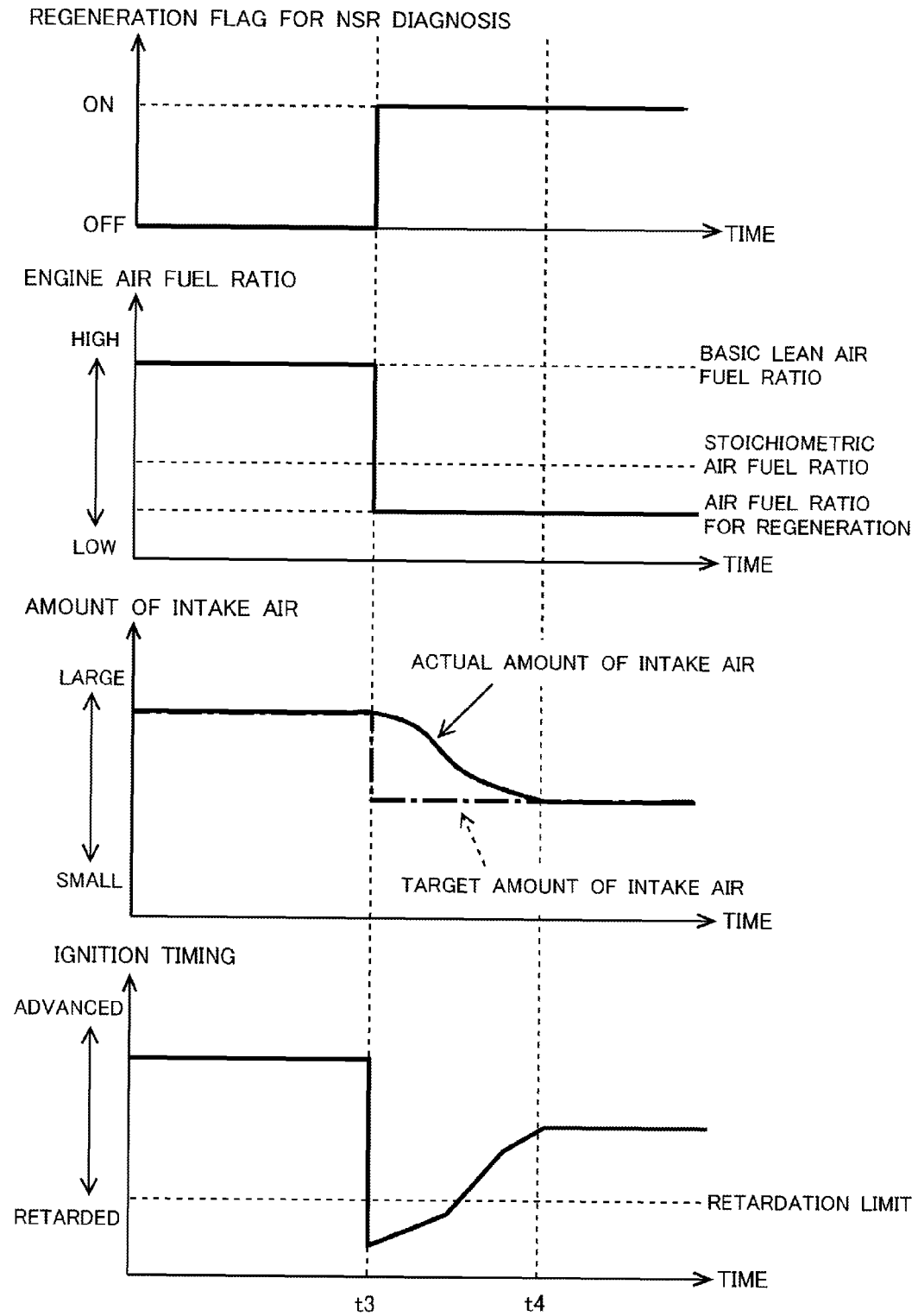

[Fig. 4]
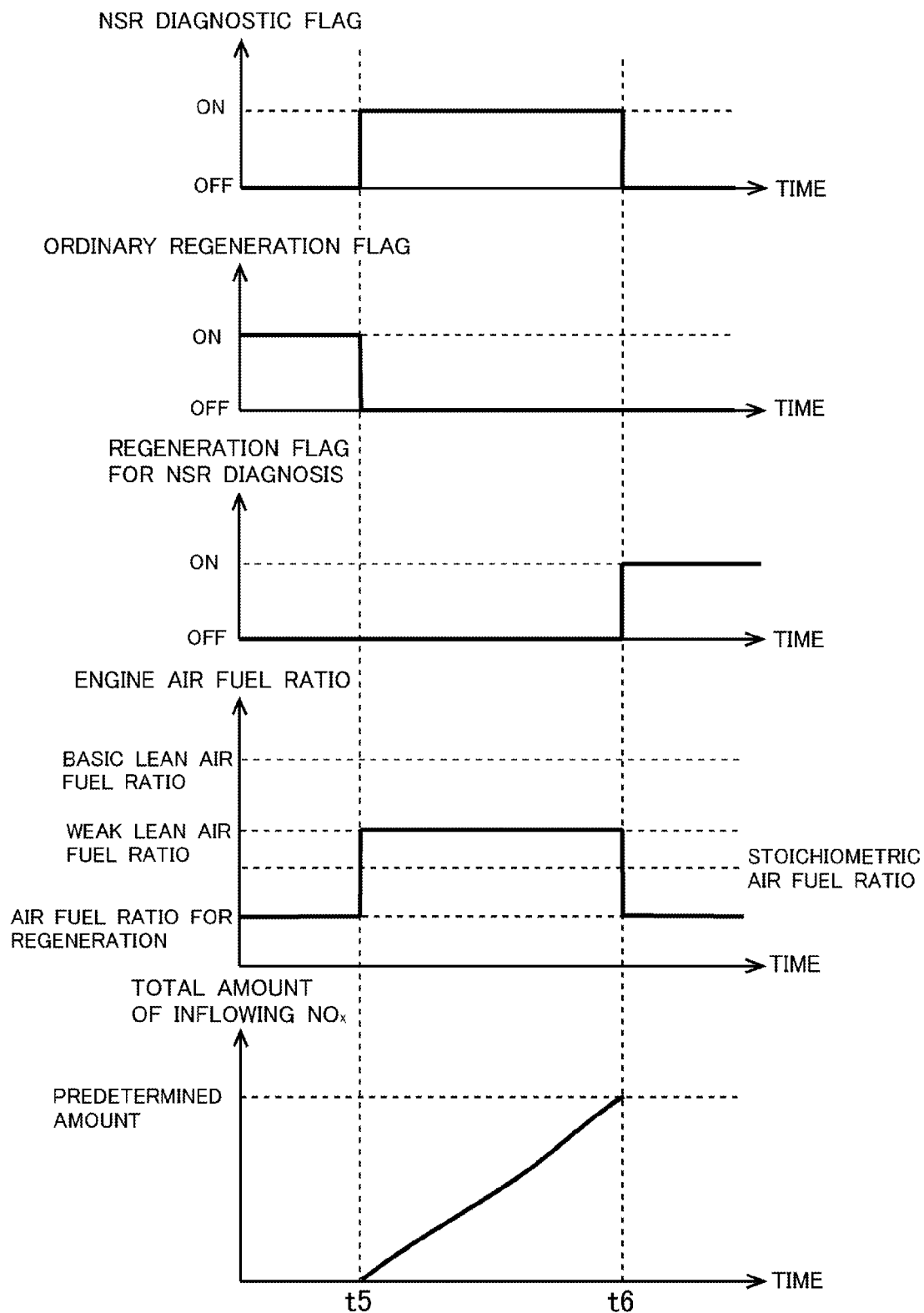

[Fig. 5]
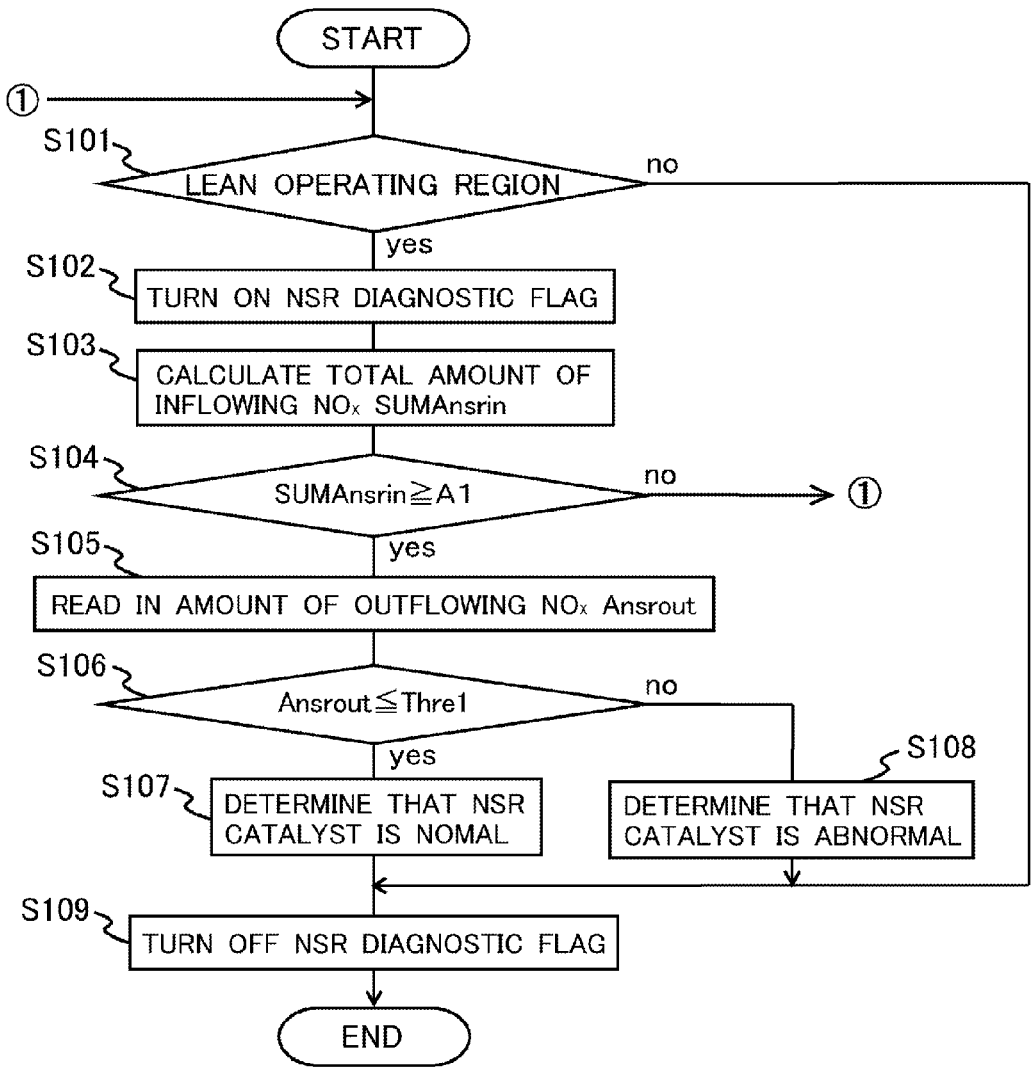

[Fig. 6]
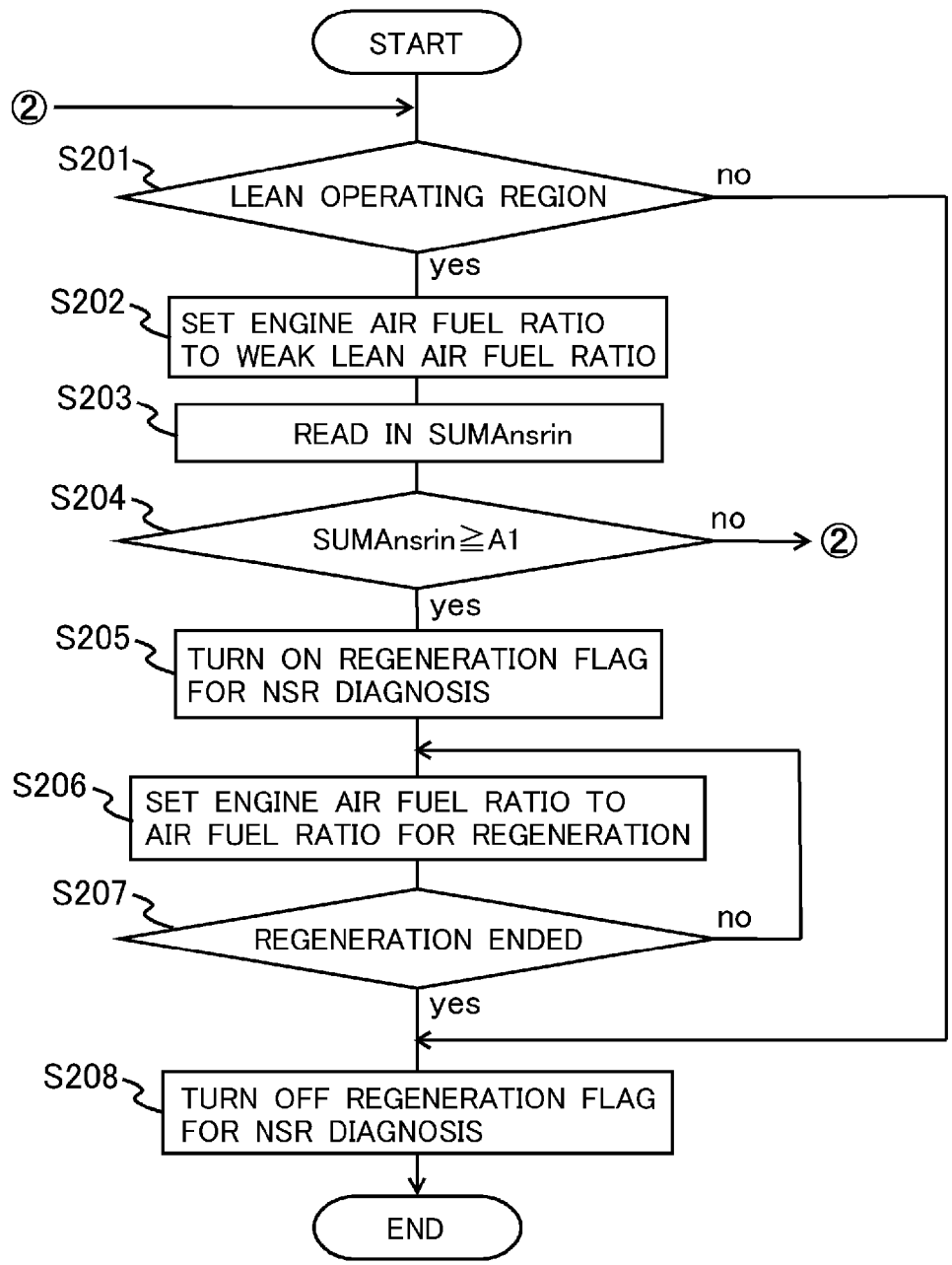

[Fig. 7]
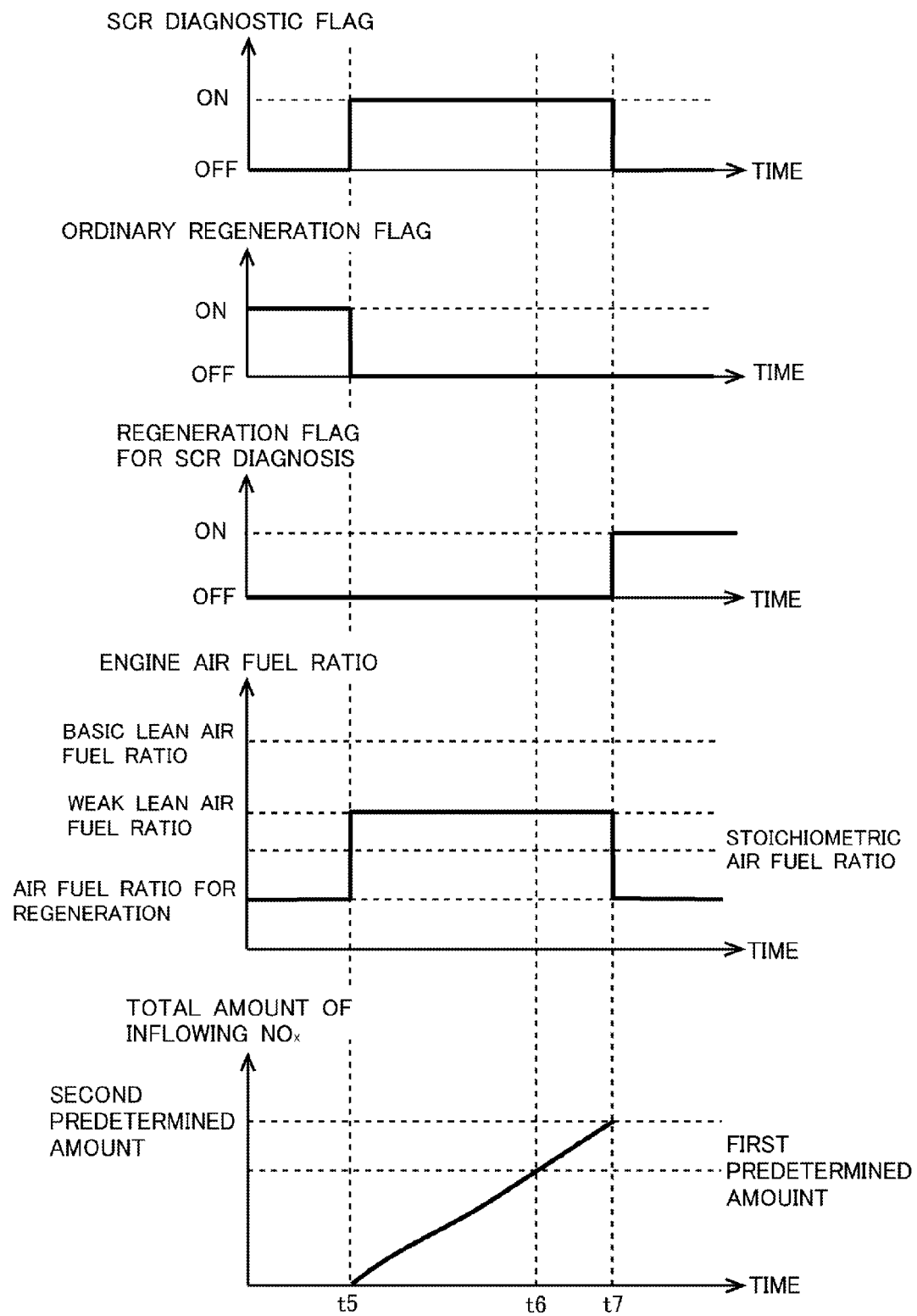

[Fig. 8]
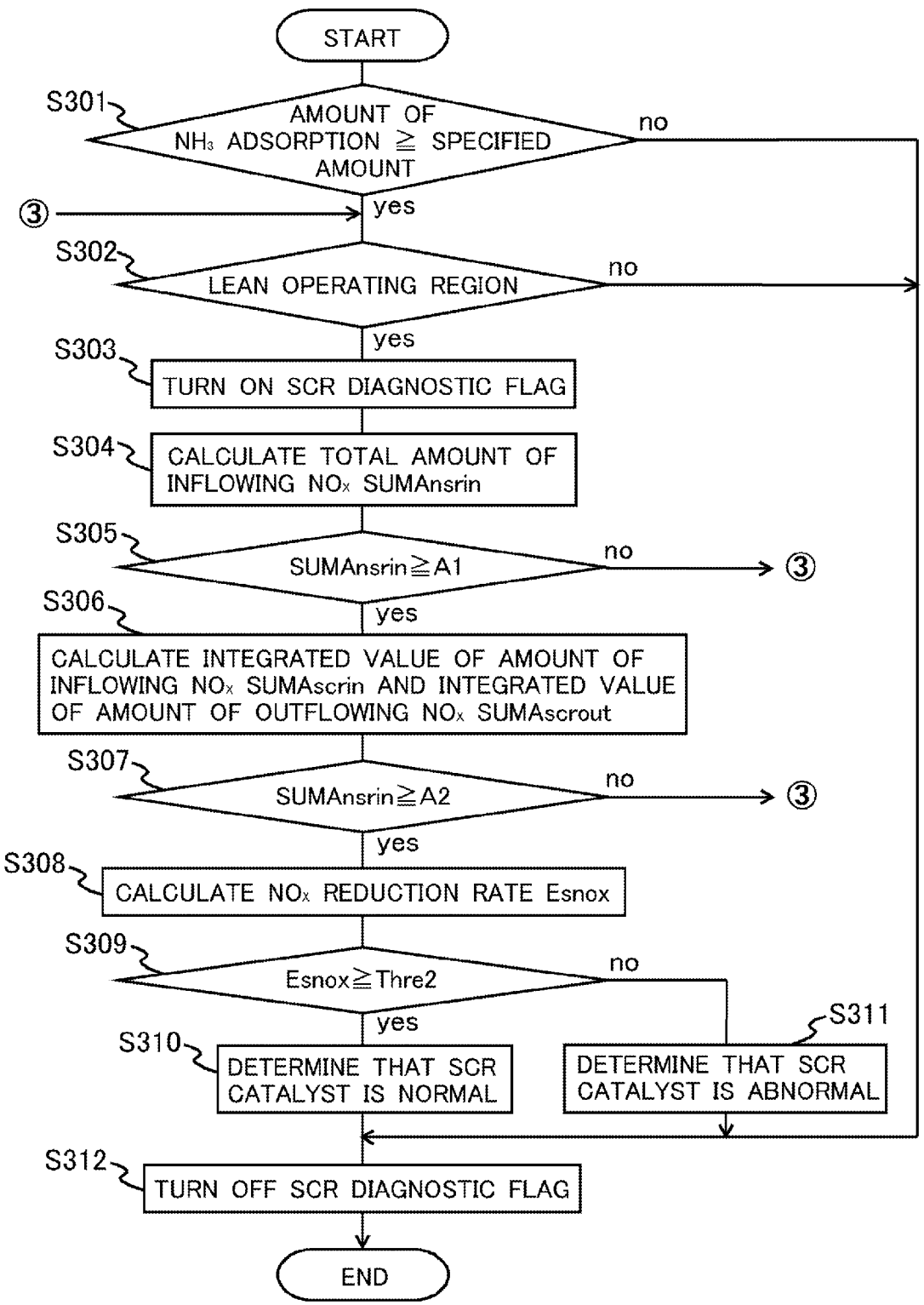

[Fig. 9]
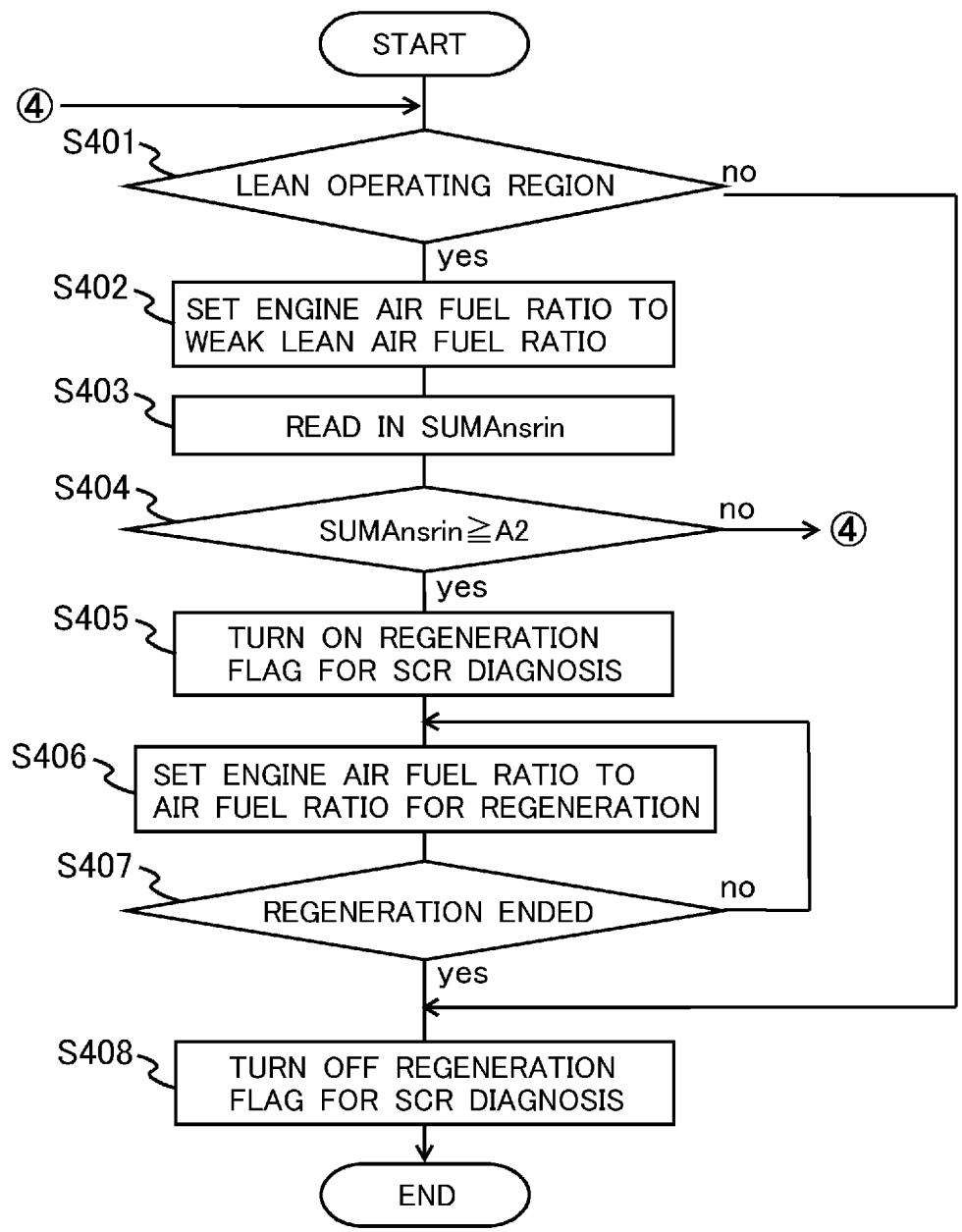

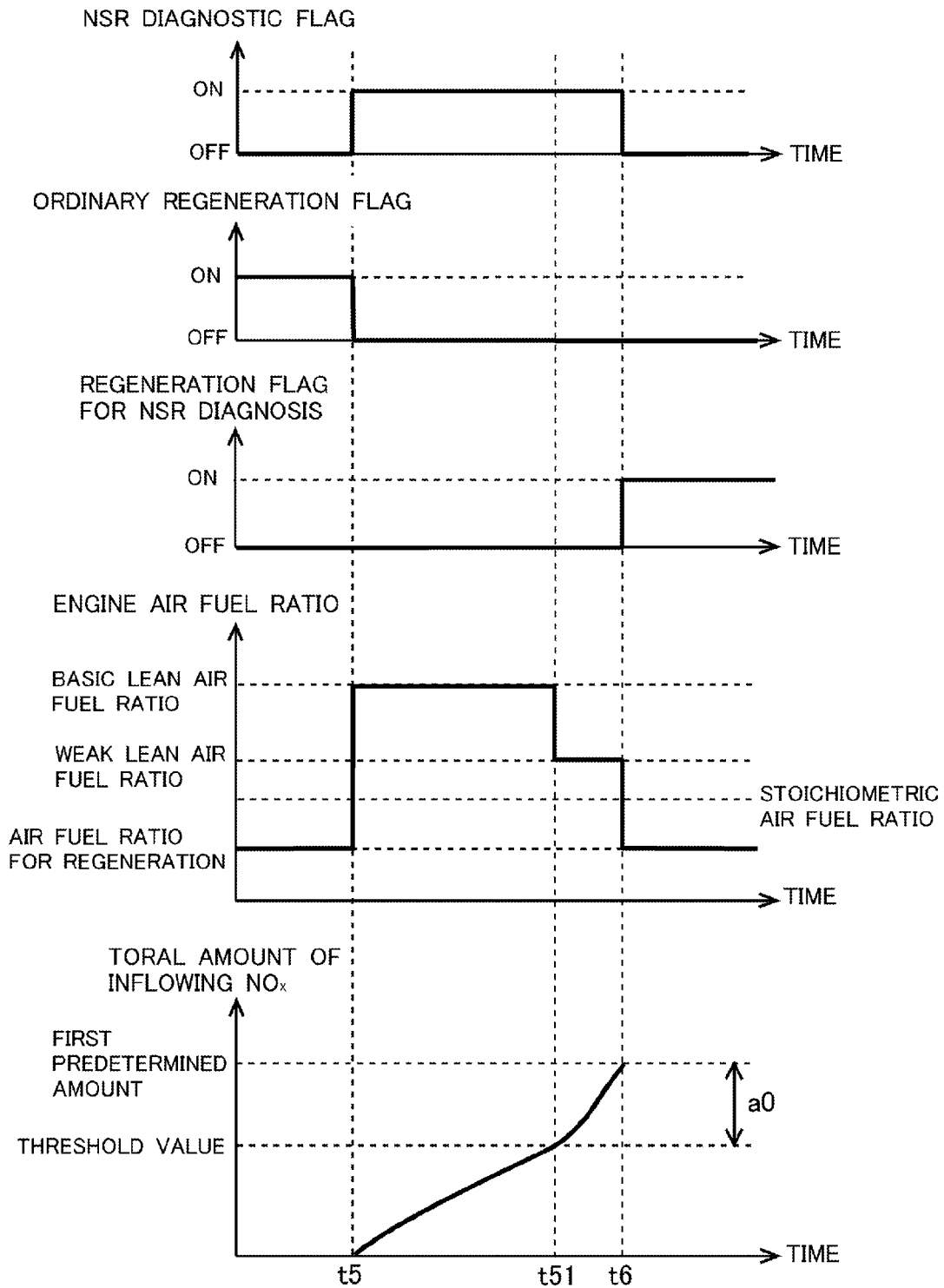

[Fig. 11]
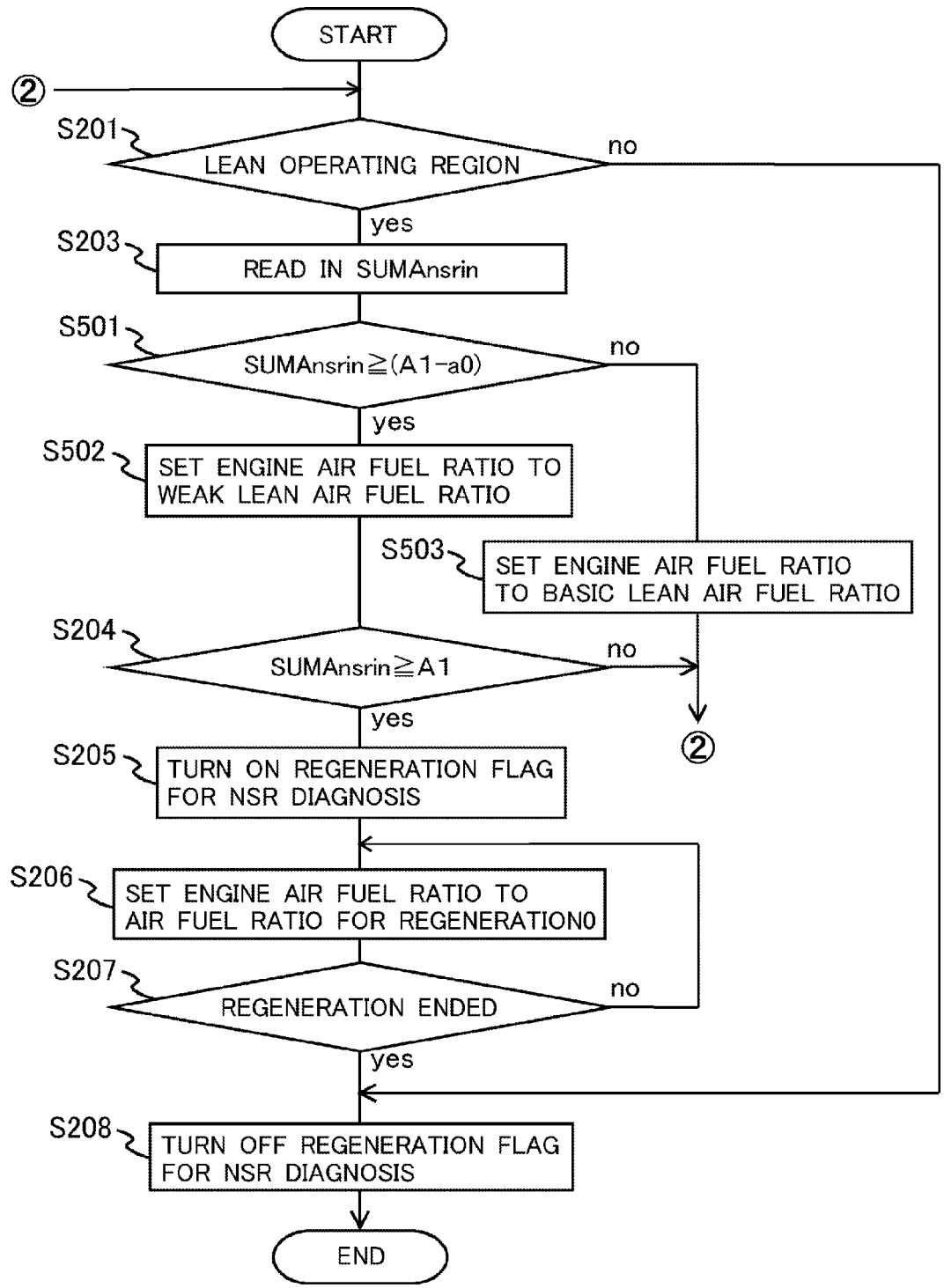

[Fig. 12]
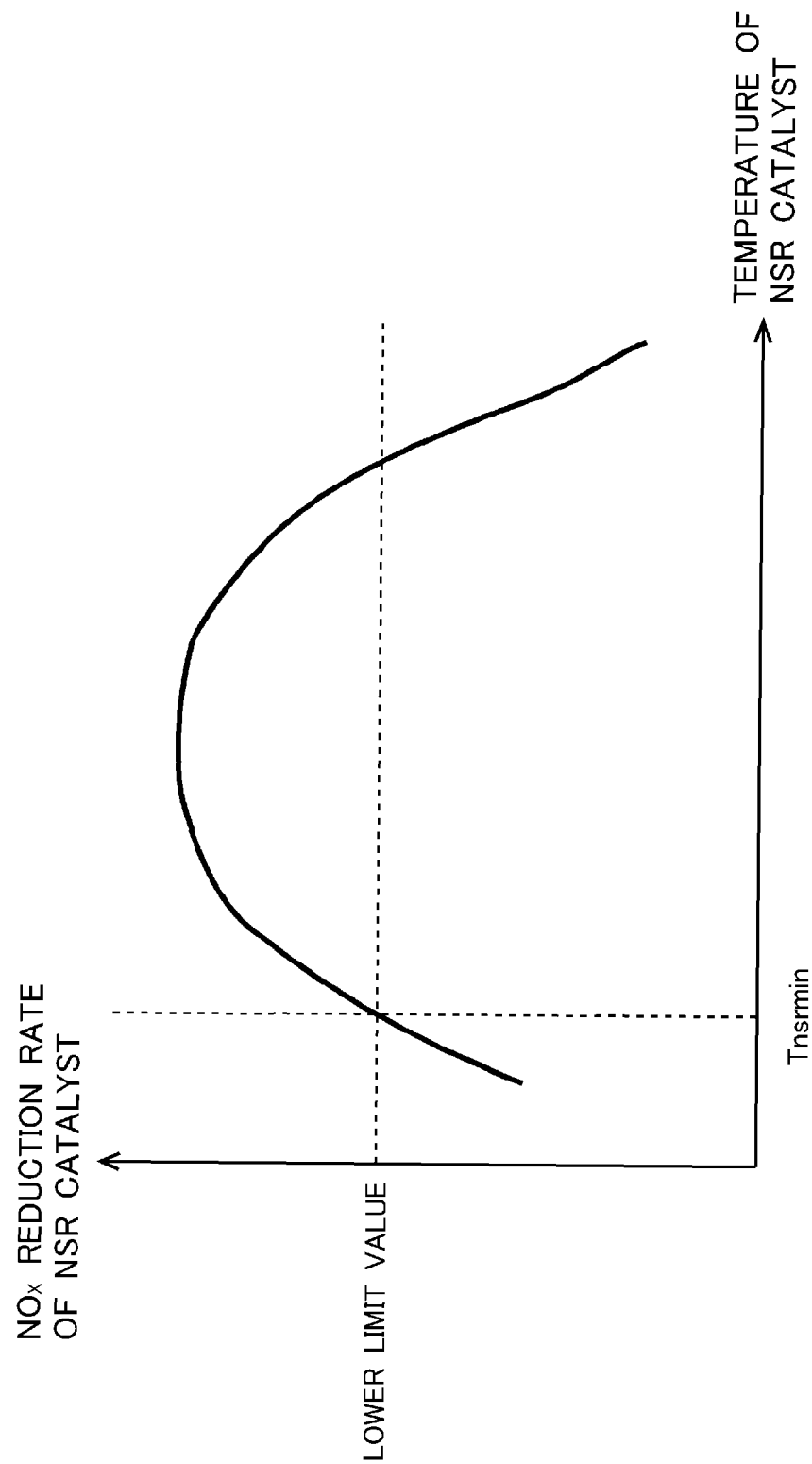

[Fig. 13]
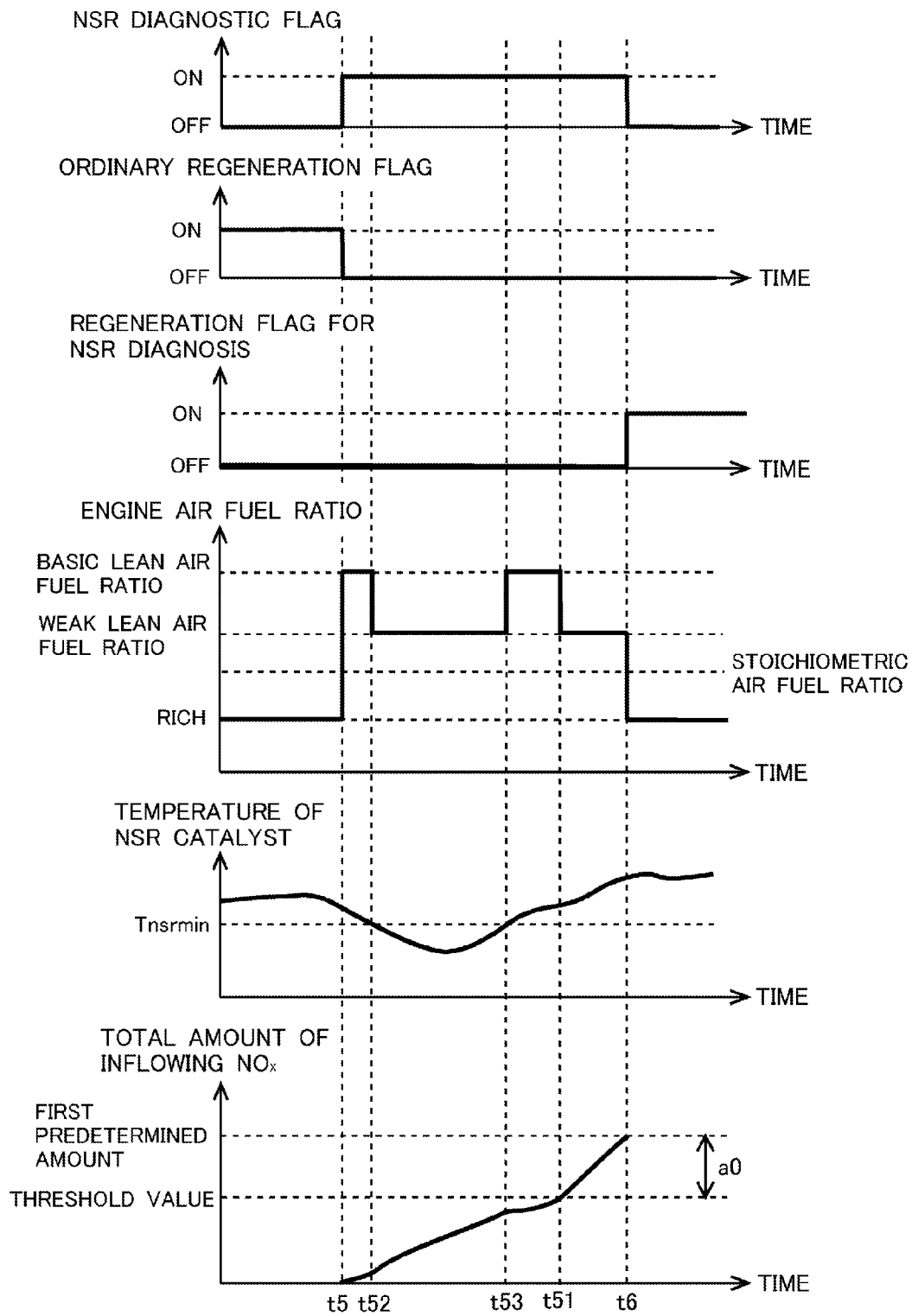

[Fig. 14]
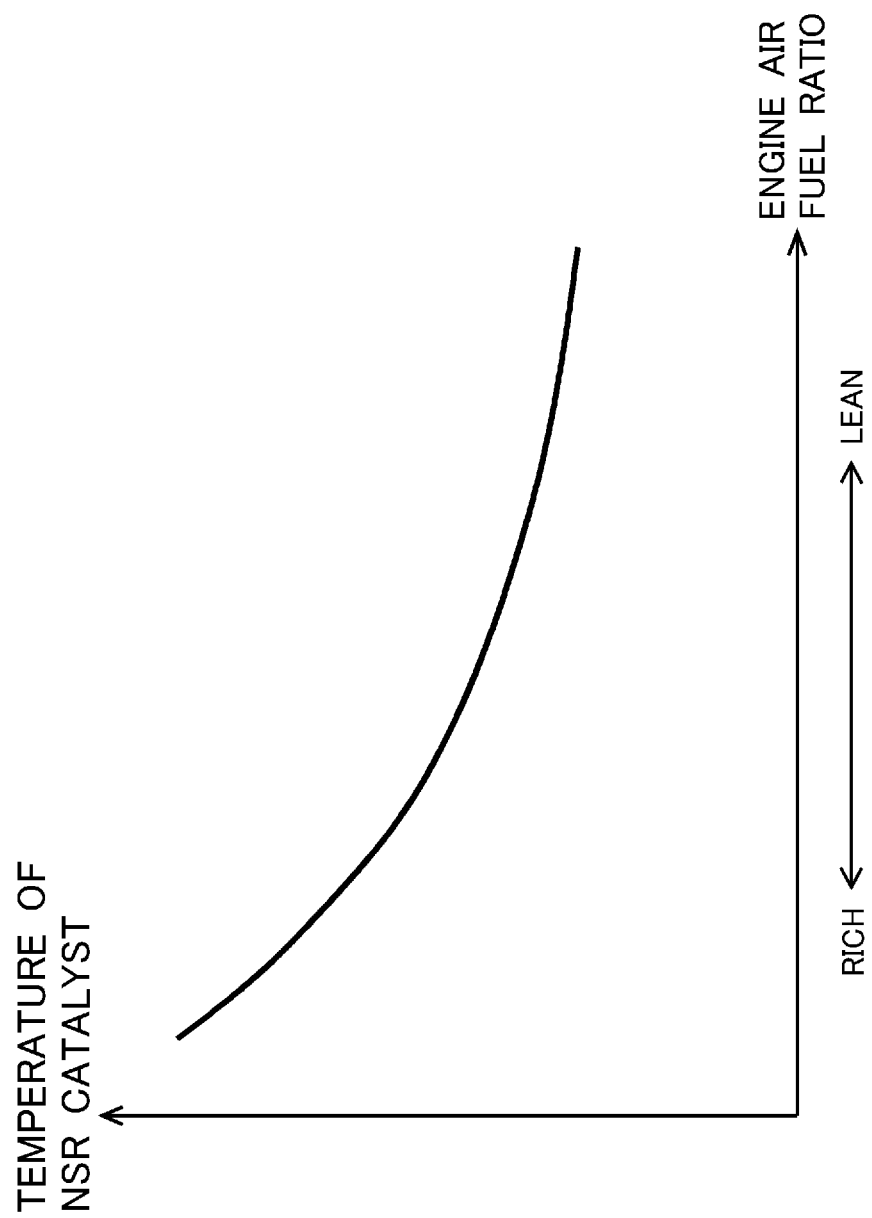

[Fig. 15]
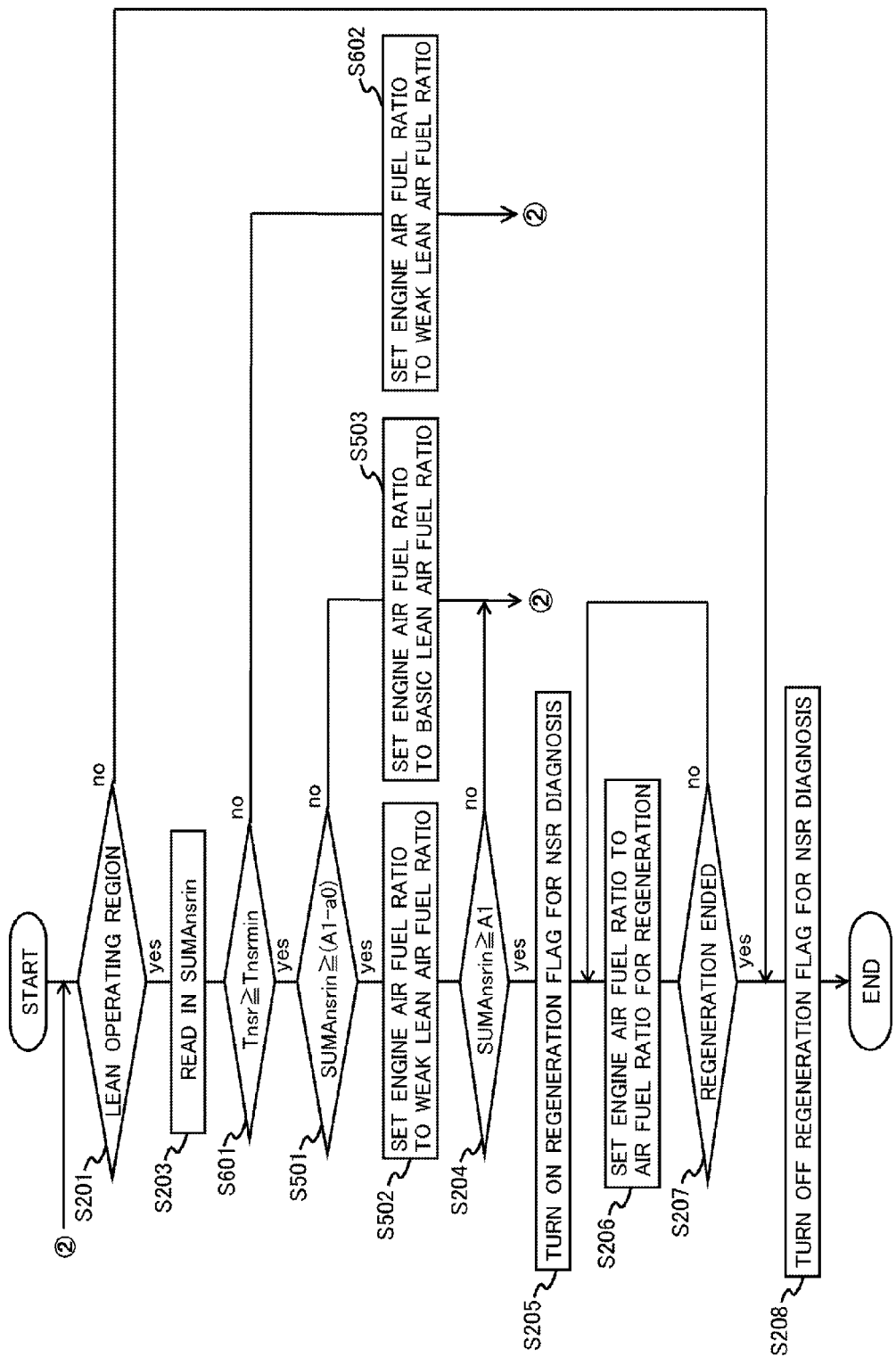

[Fig. 16]
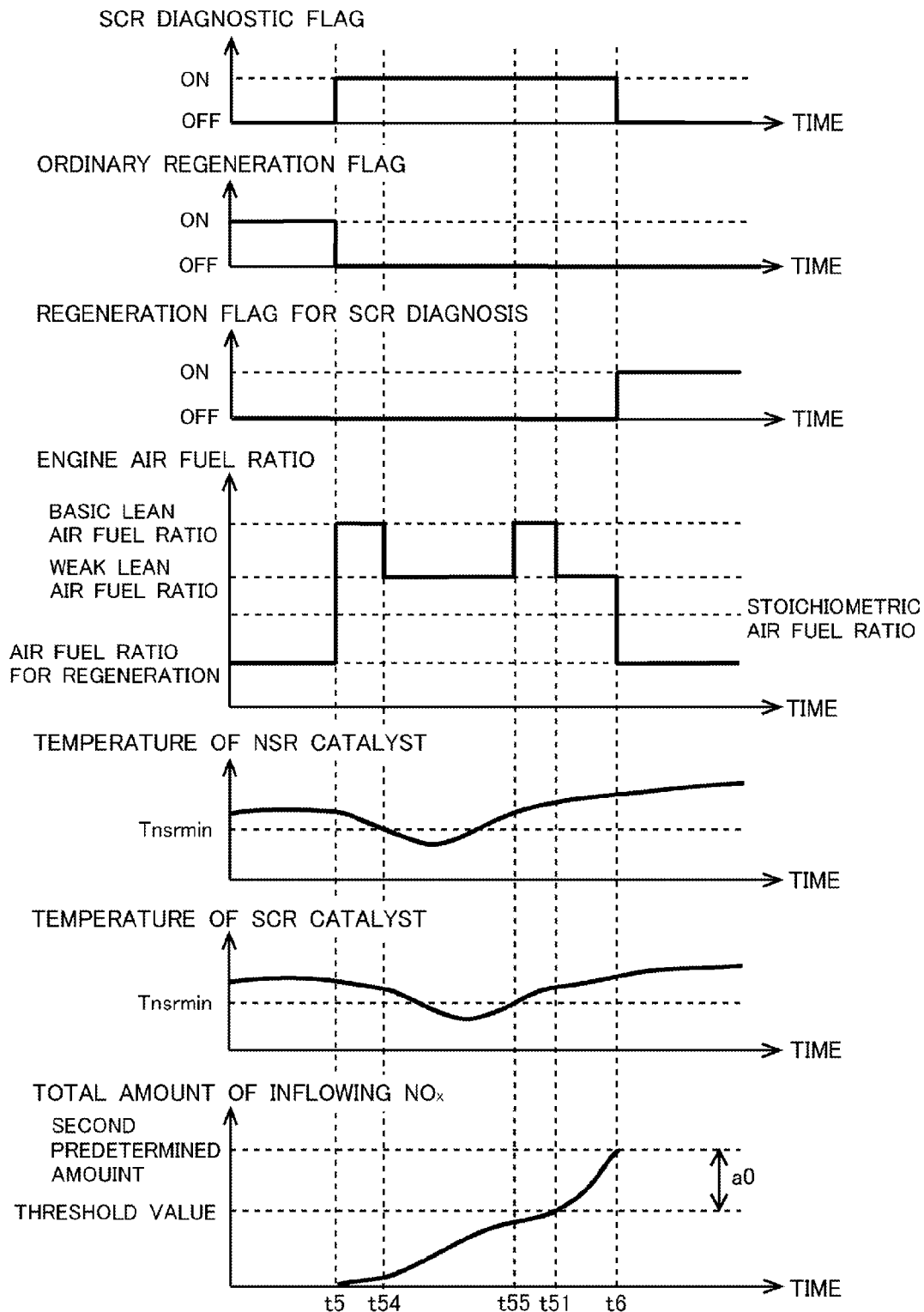

[Fig. 17]
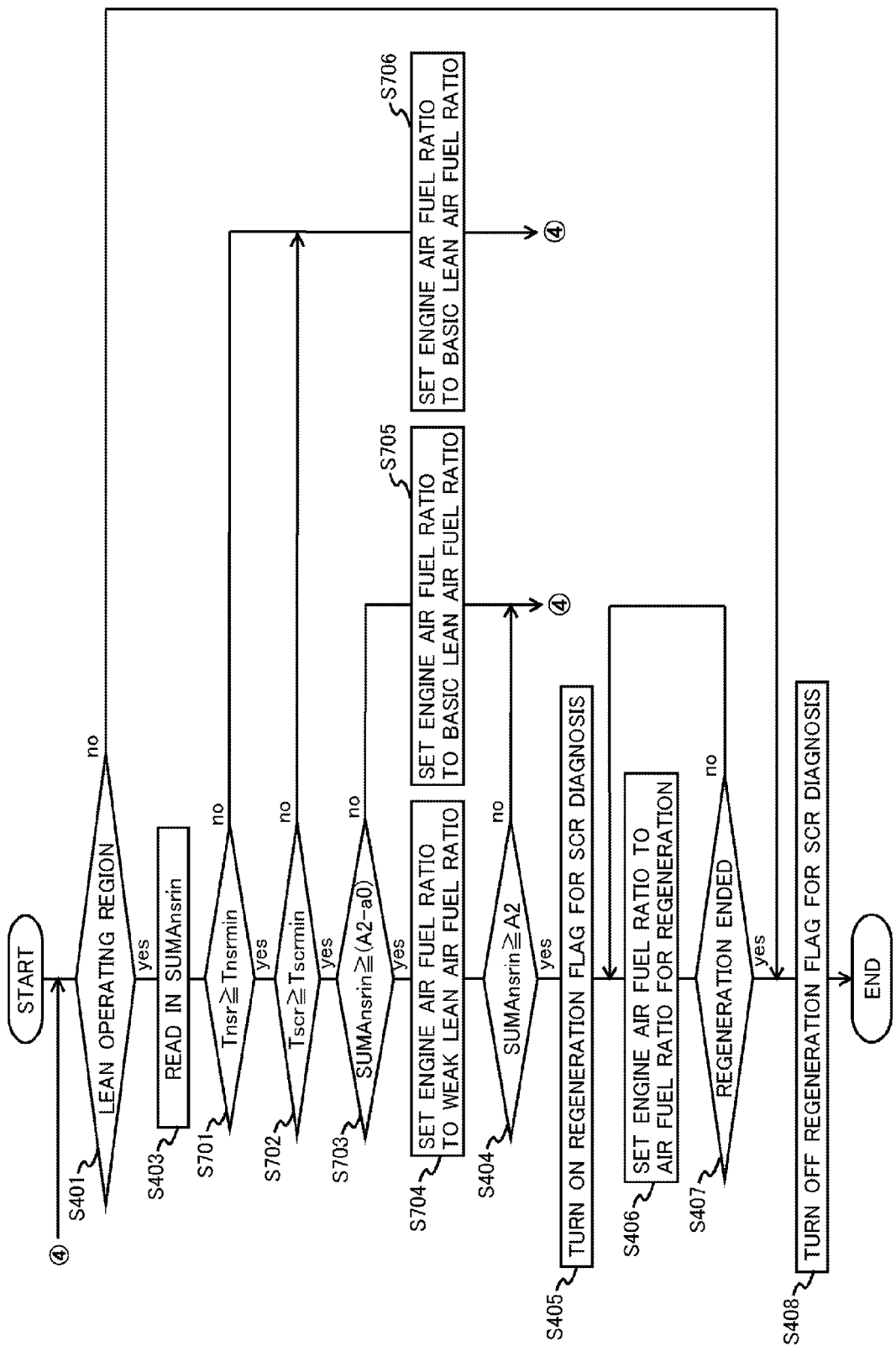

[Fig. 18]
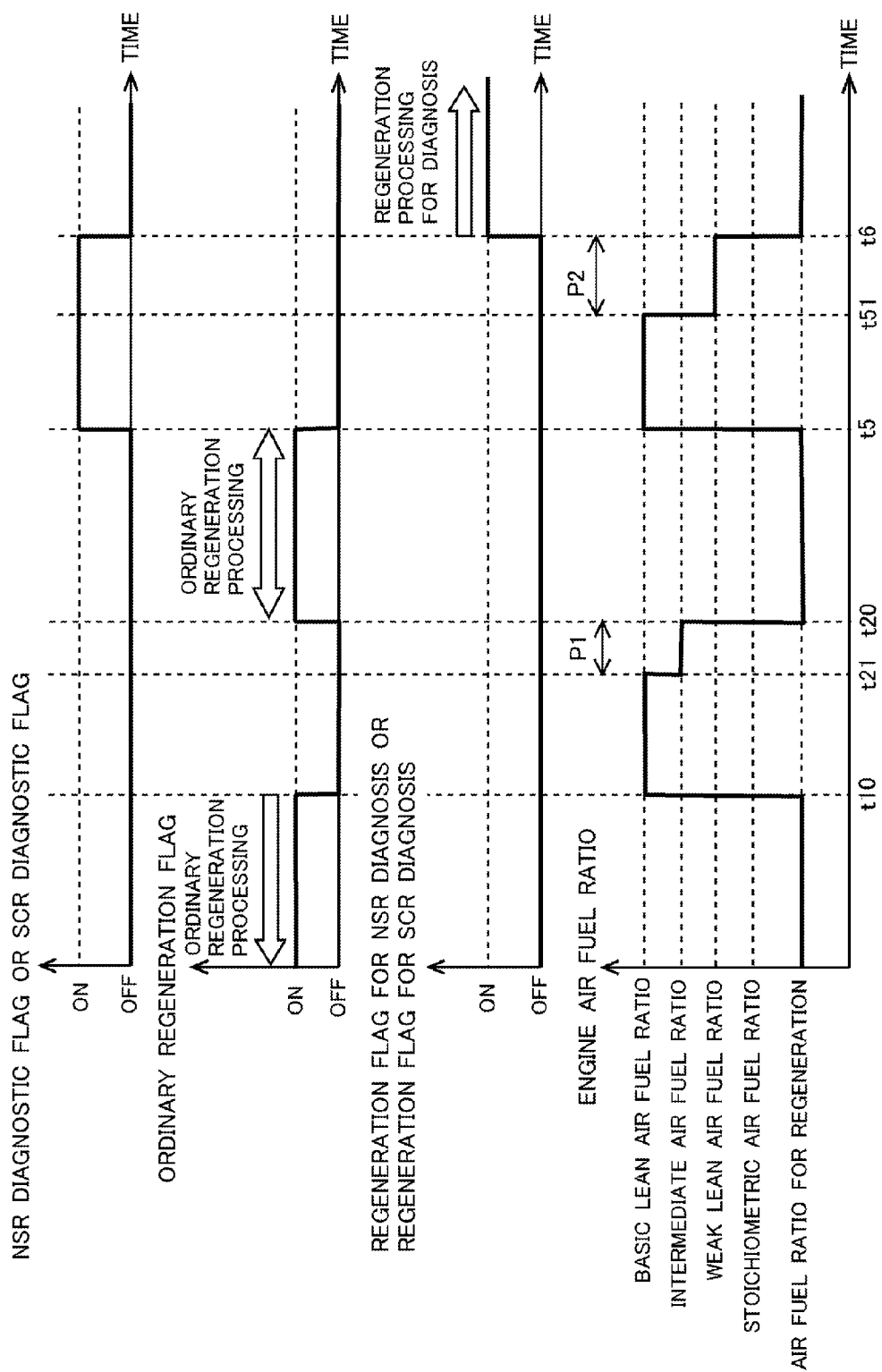

CONTROL APPARATUS FOR AN INTERNAL COMBUSTION ENGINE

CROSS-REFERENCE TO RELATED APPLICATIONS

This is a national phase application based on the PCT International Patent Application No. PCT/JP2014/004888 filed Sep. 24, 2014, claiming priority to Japanese Patent Application Nos. 2013-198525 and 2014-185208 filed Sep. 25, 2013 and Sep. 11, 2014, respectively, the entire contents of all of which are incorporated herein by reference.

TECHNICAL FIELD

The present invention relates to a technique for controlling an internal combustion engine in accompany with abnormality diagnostic processing of an exhaust gas purification device including an NSR (NOx Storage Reduction) catalyst.

BACKGROUND ART

As an exhaust gas purification device arranged in an exhaust passage of an internal combustion engine, there has been known one which receives therein an NSR catalyst. As a method for diagnosing an abnormality in the exhaust gas purification device receiving the NSR catalyst, there has been known one in which an amount of NOx occluded or stored in the NSR catalyst (hereinafter, referred to as a storage amount of NOx) is obtained at the time when an amount of NOx flowing out from the NSR catalyst exceeded a fixed amount, and the abnormality of the exhaust gas purification device is diagnosed based on the storage amount of NOx.

Specifically, in a construction in which an NOx sensor capable of measuring a concentration of NOx in an exhaust gas is arranged in the exhaust passage at the downstream side of the exhaust gas purification device, an amount of NOx, which has been stored in the NSR catalyst in a period of time from a time point at which processing for regenerating the NOx occlusion or storage capacity of the NSR catalyst ended until a time point at which the output of the NOx sensor exceeds a fixed value, is calculated, and when the thus calculated value is smaller than a threshold value, a diagnosis is made that the exhaust gas purification device is abnormal (for example, see a first patent literature).

CITATION LIST

Patent Literature

[First Patent Literature] Japanese patent laid-open publication No. 2001-271697
[Second Patent Literature] Japanese patent laid-open publication No. H07-208151
[Third Patent Literature] Japanese patent laid-open publication No. H07-180535
[Fourth Patent Literature] Japanese patent laid-open publication No. 2013-092055
[Fifth Patent Literature] Japanese patent laid-open publication No. H09-184438

SUMMARY OF INVENTION

Technical Problem

However, when abnormality diagnostic processing for the exhaust gas purification device is carried out by means of the above-mentioned method, the NOx storage capacity of the NSR catalyst will become low, and hence, after the end of the abnormality diagnostic processing, it is necessary to remove or reduce the NOx stored in the NSR catalyst quickly, thereby to regenerate the NOx storage capacity of the NSR catalyst.

In cases where the NOx storage capacity of the NSR catalyst is caused to be regenerated, the NOx stored in the NSR catalyst is caused to be desorbed by setting an engine air fuel ratio (an air fuel ratio of a mixture to be supplied to the internal combustion engine) to a rich air fuel ratio (e.g., about 12) lower than a stoichiometric air fuel ratio, so that the NOx thus desorbed from the NSR catalyst is caused to be reduced by surplus unburnt fuel components (e.g., hydrocarbon (HC), carbon monoxide (CO), etc.) contained in the exhaust gas. However, in cases where the engine air fuel ratio is set to an air fuel ratio which is equal to or higher than 20, an amount of change of the engine air fuel ratio at the time when the processing of regenerating the NOx storage capacity of the NSR catalyst is started becomes large. As a result, there will be a possibility that the output (torque) of the internal combustion engine may increase.

In addition, a certain amount of time will be required from the time point at which the processing of regenerating the NOx storage capacity of the NSR catalyst ended until the time point at which the output of the NOx sensor exceeds the fixed value, and so there will be a possibility that before the output of the NOx sensor exceeds the fixed value, the engine air fuel ratio may be changed into the stoichiometric air fuel ratio or a rich air fuel ratio. In such a case, the abnormality diagnostic processing has to be interrupted or stopped, and so there will be a possibility that it may become impossible to detect the abnormality of the NSR catalyst in a quick manner.

The present invention has been made in view of the actual circumstances as referred to above, and the object of the invention is to detect an abnormality in an exhaust gas purification device in a quick manner, while suppressing the fluctuation of torque at the time of regenerating the NOx storage capacity of an NSR catalyst, in a control apparatus for an internal combustion engine in which processing of regenerating the NOx storage capacity of the NSR catalyst is carried out in accompany with processing of diagnosing the abnormality of the exhaust gas purification device including the NSR catalyst.

Solution to Problem

The present invention adopts the following means or solution in order to solve the above-mentioned problems.

That is, the present invention resides in a control apparatus for an internal combustion engine in which an exhaust gas purification device including an NSR catalyst and a measuring device for measuring an amount of NOx flowing out from said NSR catalyst are arranged in an exhaust passage, and which comprises:
a regeneration unit configured to carry out regeneration processing which is processing of regenerating the NOx storage capacity of said NSR catalyst;
a diagnostic unit configured to carry out NSR diagnostic processing which is processing of diagnosing an abnormality in said NSR catalyst, based on a measured value of said measuring device at a predetermined NSR diagnostic time after said regeneration processing ended; and
a control unit configured to control an engine air fuel ratio which is an air fuel ratio of a mixture to be supplied to said internal combustion engine;

wherein in cases where said NSR diagnostic processing is carried out, said control unit controls, in a period of time from a predetermined weak lean operation start time after an end time of said regeneration processing to said NSR diagnostic time, the engine air fuel ratio to a weak lean air fuel ratio which is lower than a lean air fuel ratio according to an operating condition of the internal combustion engine and which is higher than a stoichiometric air fuel ratio, and changes, after said NSR diagnostic time, the engine air fuel ratio from said weak lean air fuel ratio to a rich air fuel ratio which is lower than the stoichiometric air fuel ratio.

The "regeneration processing" referred to herein is processing in which the NOx stored in the NSR catalyst is caused to be reduced, or processing in which sulfur poisoning of the NSR catalyst is caused to be eliminated, or the like, when the internal combustion engine is driven in a lean burn operation (an operation in which the engine air fuel ratio is set to a lean air fuel ratio) under the condition that the NSR diagnostic processing is not carried out. The "NSR diagnostic process" may be processing in which the abnormality of the NSR catalyst is diagnosed by using only an instantaneously measured value of the measuring device at the NSR diagnosis time, or may be processing in which the abnormality of the NSR catalyst is diagnosed by using an integrated value of the measured value of the measuring device in a period of time from the end time of the regeneration processing to the NSR diagnostic time including the measured value of the measuring device at the NSR diagnostic time. In addition, the "NSR diagnostic time" may be set to a time at which a predetermined period of time has elapsed from the end time of the regeneration processing by the regeneration unit, or may be set to a time at which an integrated value of NOx (hereinafter referred to as a "total amount of inflowing NOx" is called hereinafter) flowing into the NSR catalyst from the end time of the regeneration processing carried out by the regeneration unit reaches equal to or larger than a predetermined amount. The predetermined period of time or the predetermined amount in that case is set in such a manner that there occurs a significant difference in the measured value of the measuring device between a case where the NSR catalyst is normal and a case where the NSR catalyst is abnormal. Moreover, the "lean air fuel ratio according to the operating condition of the internal combustion engine" is a lean air fuel ratio which is set according to the required output (power) of the internal combustion engine in cases where the NSR diagnostic processing is not carried out, and is hereinafter referred to as a "basic lean air fuel ratio".

According to the control apparatus for an internal combustion engine as constructed in this manner, in the case where the NSR diagnostic processing is carried out, the engine air fuel ratio is controlled to a weak lean air fuel ratio, which is lower than said basic lean air fuel ratio and higher than the stoichiometric air fuel ratio, in a period of time from the weak lean operation start time (i.e., the start time of a weak lean burn operation of the internal combustion engine) to the NSR diagnostic time, among a period of time from the end time of the regeneration processing carried out by the regeneration unit to the NSR diagnostic time. Then, at the NSR diagnostic time, the engine air fuel ratio is changed over from said weak lean air fuel ratio to a rich air fuel ratio.

When the engine air fuel ratio is changed over from said weak lean air fuel ratio to a rich air fuel ratio at the NSR diagnostic time, the exhaust gas flowing into the NSR catalyst becomes a rich atmosphere. When the exhaust gas of a rich atmosphere flows into the NSR catalyst, the NOx stored in the NSR catalyst reacts with the unburnt fuel components (HC, CO, etc.) contained in the exhaust gas, while desorbing from said NSR catalyst, so that it is reduced to nitrogen ($N_2$). As a result, the NOx storage capacity of the NSR catalyst is regenerated. In the following, the processing of regenerating the NOx storage capacity of the NSR catalyst by setting the air fuel ratio after the NSR diagnostic time to the rich air fuel ratio is referred to as "regeneration processing for NSR diagnosis". Also, in the following, the regeneration processing carried out by the regeneration unit at times other than at said NSR diagnostic time is referred to as "ordinary regeneration processing".

Because said weak lean air fuel ratio is lower than said basic lean air fuel ratio, the amount of change of the engine air fuel ratio at the time of said regeneration processing for NSR diagnosis being started becomes small. As a result, the fluctuation of torque in the internal combustion engine at the time of the regeneration processing for NSR diagnosis being started becomes small.

Here, as a method of reducing the fluctuation of torque accompanying a change in the engine air fuel ratio, there can be considered a method of retarding ignition timing and a method of decreasing an amount of intake air. However, the control of the amount of intake air accompanies a response delay, and hence, when such a response delay of the amount of intake air occurs, it is necessary to reduce the fluctuation of torque by the retardation of ignition timing. Accordingly, as the amount of change of the engine air fuel ratio increases, ignition timing has to be retarded to a larger extent, thus giving rise to a possibility that the operating state of the internal combustion engine may become unstable.

On the other hand, when the amount of change of the engine air fuel ratio at the time of the regeneration processing for NSR diagnosis being started becomes small, even in cases where the response delay of the amount of intake air has occurred, it becomes unnecessary to retard ignition timing to a large extent. As a result, it becomes possible to suppress the fluctuation of torque in the internal combustion engine, without making unstable the operating state of the internal combustion engine.

In addition, in cases where the engine air fuel ratio is set to the weak lean air fuel ratio, the amount of NOx to be discharged from the internal combustion engine becomes large, in comparison with the case where the engine air fuel ratio is set to the basic lean air fuel ratio. For that reason, the period of time from the end time of the ordinary regeneration processing to the NSR diagnostic time becomes short by setting the engine air fuel ratio in the period of time from the weak lean operation start time to the NSR diagnostic time among the period of time from the end time of the ordinary regeneration processing until the NSR diagnostic time to the weak lean air fuel ratio.

Here, when the period of time from the end time of the ordinary regeneration processing to the NSR diagnostic time becomes long, there will be a possibility that the operating state of the internal combustion engine may deviate from a lean operating region (i.e., an operating region in which the engine air fuel ratio is set to the lean air fuel ratio which is higher than the stoichiometric air fuel ratio) in the middle of that period of time, so that the NSR diagnostic processing may be stopped or interrupted.

On the other hand, when the period of time from the end time of the ordinary regeneration processing to the NSR diagnostic time becomes short, a possibility that the operating state of the internal combustion engine may deviate from the lean operating region in the middle of said period of time will become small. Accordingly, a possibility that the NSR diagnostic processing is stopped or interrupted in the middle thereof will also become small. As a result, it becomes possible to detect the abnormality of the NSR catalyst in a quick manner.

Accordingly, according to the control apparatus for an internal combustion engine of the present invention, it becomes possible to detect the abnormality of the exhaust gas purification device in a quick manner, while suppressing the fluctuation of torque at the time when the regeneration processing for NSR diagnosis is carried out.

Here, note that in the control apparatus for an internal combustion engine of the present invention, said weak lean operation start time may be set to the end time of the ordinary regeneration processing. In that case, in the entire period of time from the time point at which the ordinary regeneration processing ended to the NSR diagnostic time, the engine air fuel ratio will be set to said weak lean air fuel ratio. As a result, the period of time from the end time of the ordinary regeneration processing to the NSR diagnostic time can be shortened in a more reliable manner. Therefore, the abnormality of the exhaust gas purification device can be detected in a quicker manner. Moreover, because the engine air fuel ratio will be changed over from the rich air fuel ratio to said weak lean air fuel ratio at the end time of the ordinary regeneration processing, the fluctuation of torque of the internal combustion engine can also be suppressed to be small, in comparison with the case where the engine air fuel ratio is changed over from the rich air fuel ratio to the basic lean air fuel ratio at the end time of the ordinary regeneration processing.

Moreover, in the control apparatus for an internal combustion engine of the present invention, said weak lean operation start time may be set to be after the end time of the ordinary regeneration processing and before said NSR diagnostic time. For example, in the case where the time when the total amount of inflowing NOx from the end time of the ordinary regeneration processing reaches equal to or larger than said predetermined amount is set as said NSR diagnostic time, said weak lean operation start time may be set to a time at which the total amount of inflowing NOx from a time point at which the ordinary regeneration processing ended becomes equal to the threshold value which is less than said predetermined amount. In that case, the control unit need only set the air fuel ratio in the period of time from the end time of the ordinary regeneration processing to the weak lean operation start time to the basic lean air fuel ratio.

According to such a construction, only in a part of the period of time just before the regeneration processing for NSR diagnosis is started, among the period of time from the time point at which said ordinary regeneration processing ended to the NSR diagnostic time, the engine air fuel ratio will be set to the weak lean air fuel ratio. Here, in cases where the engine air fuel ratio is set to the weak lean air fuel ratio, there will be a possibility that the amount of fuel consumption of the internal combustion engine becomes large, in comparison with the case where the engine air fuel ratio is set to the basic lean air fuel ratio. Accordingly, when the engine air fuel ratio is set to the weak lean air fuel ratio only in a part of the period of time from the time point at which said ordinary regeneration processing ended to the NSR diagnostic time, it is possible to make small the fluctuation of torque in the internal combustion engine at the time of the regeneration processing for NSR diagnosis being started, while suppressing small an increase in the amount of fuel consumption. In addition, it is also possible to make short the period of time from the end time of said ordinary regeneration processing to the NSR diagnostic time, in comparison with the case where in the entire period of time from the end time of the ordinary regeneration processing to the NSR diagnostic time, the engine air fuel ratio is set to the basic lean air fuel ratio.

Here, the control unit according to the present invention may set the engine air fuel ratio to said weak lean air fuel ratio in a period of time in which the temperature of said NSR catalyst becomes lower than a temperature range in which the NOx reduction ability of said NSR catalyst becomes active, among the period of time from the time point at which said ordinary regeneration processing ended to said weak lean operation start time.

In cases where the engine air fuel ratio is set to the weak lean air fuel ratio, there will be a tendency that the temperature of the NSR catalyst becomes high, in comparison with the case where the engine air fuel ratio is set to the basic lean air fuel ratio. Accordingly, when the engine air fuel ratio is controlled to be the weak lean air fuel ratio in the period of time in which the temperature of said NSR catalyst becomes lower than the temperature range (i.e., active temperature range) in which the NOx reduction ability of said NSR catalyst becomes active, among the period of time from the end time of said ordinary regeneration processing to said weak lean operation start time, it is suppressed that the temperature of the NSR catalyst at the time of the regeneration processing for NSR diagnosis being carried out becomes lower than the active temperature range. As a result, by carrying out the regeneration processing for NSR diagnosis, it becomes possible to regenerate the NOx storage capacity of the NSR catalyst in a more reliable manner.

Next, in the control apparatus for an internal combustion engine of the present invention, the exhaust gas purification device may be equipped with an NSR catalyst and an SCR (Selective Catalytic Reduction) catalyst which is arranged at the downstream side of the NSR catalyst, and the measuring device may be equipped with a first measuring unit that measures an amount of NOx flowing out from the NSR catalyst, and a second measuring unit that measures an amount of NOx flowing out from the SCR catalyst. In such an arrangement, in cases where it is necessary to diagnose the abnormality of the SCR catalyst, said control unit may control, in a period of time from said weak lean operation start time to a predetermined SCR diagnostic time which is later than said NSR diagnostic time, the engine air fuel ratio to a weak lean air fuel ratio which is lower than said basic lean air fuel ratio and which is higher than the stoichiometric air fuel ratio, and may change, after said SCR diagnostic time, the engine air fuel ratio from said weak lean air fuel ratio to a rich air fuel ratio which is lower than the stoichiometric air fuel ratio. Then, the diagnostic unit may carry out SCR diagnostic processing which is processing of diagnosing an abnormality in said SCR catalyst, based on a measured value of said second measuring unit at said SCR diagnostic time. Here, note that the "SCR diagnostic time" referred to herein is set in such a manner that there occurs a significant difference in the measured value of the second measuring unit between a case where the SCR catalyst is normal and a case where the SCR catalyst is abnormal.

According to such a construction, in cases where the SCR diagnostic processing is carried out, the engine air fuel ratio in the period of time from said weak lean operation start time to said SCR diagnostic time will be set to the weak lean air fuel ratio, so that the regeneration processing for NSR diagnosis will be no longer carried out at the NSR diagnostic time in the middle of that period of time. Then, when the engine air fuel ratio is changed over from said weak lean air fuel ratio to a rich air fuel ratio at the SCR diagnostic time which is later than the NSR diagnostic time, the NOx storage capacity of the NSR catalyst will be regenerated. In the following, the processing of regenerating the NOx storage capacity of the NSR catalyst by setting the engine air fuel ratio after the SCR diagnostic time to the rich air fuel ratio is referred to as "regeneration processing for SCR diagnosis". When the regeneration processing for SCR diagnosis is started, the engine air fuel ratio is changed over from the weak lean air fuel ratio to the rich air fuel ratio, as in the case where the regeneration processing for NSR diagnosis is carried out, so that the amount of change of the engine air fuel ratio can be suppressed to be small. As a result, it becomes possible to suppress the fluctuation of torque in the internal combustion engine, without making a large retardation of ignition timing. In addition, the period of time from the end time of said ordinary regeneration processing to the SCR diagnostic time becomes short, by setting the engine air fuel ratio in a period of time from the weak lean operation start time until the SCR diagnostic time to the weak lean air fuel ratio.

Accordingly, it becomes possible to detect the abnormality of the SCR catalyst in a quick manner, while suppressing the fluctuation of torque in the case where the SCR diagnostic processing is carried out. Here, the weak lean operation start time in the case of the SCR diagnostic processing is carried out may be set to the end time of the ordinary regeneration processing, or may be set to be after the end time of the ordinary regeneration processing and before said SCR diagnostic time.

Here, note that the control unit according to the present invention may set the engine air fuel ratio to an intermediate air fuel ratio which is lower than the basic lean air fuel ratio and higher than the stoichiometric air fuel ratio, in a period of time from a predetermined time before said ordinary regeneration processing is started until said ordinary regeneration processing is started.

When the engine air fuel ratio is changed over from the basic lean air fuel ratio to a rich air fuel ratio at the time the ordinary regeneration processing is started, the fluctuation of torque in the internal combustion engine may become large. On the other hand, when the engine air fuel ratio is changed over from the intermediate air fuel ratio to a rich air fuel ratio at the time the ordinary regeneration processing is started, the fluctuation of torque in the internal combustion engine can be suppressed to be small.

Here, note that when a period of time in which the engine air fuel ratio is set to the intermediate air fuel ratio becomes unnecessarily long, the amount of fuel consumption may be increased, or the frequency of carrying out the ordinary regeneration processing may become high. For that reason, it is desirable to make the period of time, in which the engine air fuel ratio is set to the intermediate air fuel ratio, shorter than the period of time from said weak lean operation start time to the NSR diagnostic time (or the SCR diagnostic time). As a result, the fluctuation of torque at the time of the ordinary regeneration processing being started can be made small, while suppressing an increase in the amount of fuel consumption as well as an increase in the frequency of carrying out the ordinary regeneration processing.

In addition, said intermediate air fuel ratio may be set to be higher than said weak lean air fuel ratio. When the intermediate air fuel ratio is set in this manner, the amount of fuel consumption and the amount of NOx to be discharged from the internal combustion engine in the case where the engine air fuel ratio is set to the intermediate air fuel ratio becomes less than those in the case where the engine air fuel ratio is set to the weak lean air fuel ratio. Accordingly, the fluctuation of torque at the time of the ordinary regeneration processing being started can be made small, while suppressing the increase in the amount of fuel consumption as well as the increase in the frequency of carrying out the ordinary regeneration processing in a more reliable manner.

Advantageous Effects of Invention

According to the present invention, in a control apparatus for an internal combustion engine in which processing of regenerating the NOx storage capacity of an NSR catalyst is carried out in accompany with processing of diagnosing an abnormality in an exhaust gas purification device including the NSR catalyst, it becomes possible to detect the abnormality of the exhaust gas purification device in a quick manner, while suppressing the fluctuation of torque at the time of regenerating the NOx storage capacity of the NSR catalyst.

BRIEF DESCRIPTION OF DRAWINGS

FIG. 1 is a view showing the schematic construction of an internal combustion engine and its exhaust system, to which the present invention is applied.

FIG. 2 is a view showing changes over time of an integrated value of an amount of NOx flowing into an NSR catalyst and amounts of NOx flowing out from the NSR catalyst per unit time.

FIG. 3 is a view showing changes over time of an engine air fuel ratio, an amount of intake air, and ignition timing, in cases where processing of regenerating the NOx storage capacity of the NSR catalyst is carried out.

FIG. 4 is a timing chart showing a control method for the engine air fuel ratio in the case where NSR diagnostic processing is carried out in a first embodiment of the present invention.

FIG. 5 is a flow chart showing a processing routine which is executed by an ECU in the case where NSR diagnostic processing is carried out in the first embodiment of the present invention.

FIG. 6 is a flow chart showing a processing routine which is executed by the ECU in the case where the engine air fuel ratio at the time of the NSR diagnostic processing being carried out is controlled in the first embodiment of the present invention.

FIG. 7 is a timing chart showing a control method for an engine air fuel ratio in the case where SCR diagnostic processing is carried out in a second embodiment of the present invention.

FIG. 8 is a flow chart showing a processing routine which is executed by an ECU in the case where the SCR diagnostic processing is carried out in the second embodiment of the present invention.

FIG. 9 is a flow chart showing a processing routine which is executed by the ECU in the case where the engine air fuel ratio at the time of the SCR diagnostic processing being carried out is controlled in the second embodiment of the present invention.

FIG. 10 is a timing chart showing a control method for an engine air fuel ratio in the case where NSR diagnostic processing is carried out in a third embodiment of the present invention.

FIG. 11 is a flow chart showing a processing routine which is executed by an ECU in the case where the engine air fuel ratio at the time of the NSR diagnostic processing being carried out is controlled in the third embodiment of the present invention.

FIG. 12 is a view showing the relation between the temperature of an NSR catalyst and the NOx removal or reduction ratio of the NSR catalyst in a fourth embodiment of the present invention.

FIG. 13 is a timing chart showing a control method for an engine air fuel ratio in the case where NSR diagnostic processing is carried out in the fourth embodiment of the present invention.

FIG. 14 is a view showing the relation between the engine air fuel ratio and the temperature of the NSR catalyst in the fourth embodiment of the present invention.

FIG. 15 is a flow chart showing a processing routine which is executed by an ECU in the case where the engine air fuel ratio at the time of the NSR diagnostic processing being carried out is controlled in the fourth embodiment of the present invention.

FIG. 16 is a timing chart showing a control method for the engine air fuel ratio in the case where SCR diagnostic processing is carried out in the fourth embodiment of the present invention.

FIG. 17 is a flow chart showing a processing routine which is executed by the ECU in the case where the engine air fuel ratio at the time of the SCR diagnostic processing being carried out is controlled in the fourth embodiment of the present invention.

FIG. 18 is a timing chart showing a control method in the case where an intermediate air fuel ratio is set in a fifth embodiment of the present invention.

DESCRIPTION OF EMBODIMENTS

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

First Embodiment

First, reference will be made to a first embodiment of the present invention based on FIGS. 1 through 6. FIG. 1 is a view showing the schematic construction of an internal combustion engine and its exhaust system, to which the present invention is applied. The internal combustion engine 1 shown in FIG. 1 is a spark ignition internal combustion engine capable of performing a lean burn operation. Here, note that the internal combustion engine 1 may be a compression ignition internal combustion engine in which a lean burn operation is carried out.

The internal combustion engine 1 is provided with a fuel injection valve 2. The fuel injection valve 2 may be a valve mechanism which serves to inject fuel into an intake passage (e.g., an intake port), or may be a valve mechanism which serves to inject fuel into a cylinder.

The internal combustion engine 1 is connected to an exhaust passage 3. The exhaust passage 3 is a passage through which a gas (an exhaust gas) burned in the interior of the cylinder of the internal combustion engine 1 flows. In a middle portion of the exhaust passage 3, there is arranged an exhaust gas purification device. The exhaust gas purification device is provided with a first catalyst casing 4, a second catalyst casing 5, and a third catalyst casing 6.

The first catalyst casing 4 receives a three-way catalyst which is composed of a honeycomb structured body covered with a coat layer such as alumina, and a precious metal (e.g., platinum, palladium, or rhodium, etc.) supported by the coat layer.

The second catalyst casing 5 is arranged in the exhaust passage 3 at the downstream side of the first catalyst casing 4. The second catalyst casing 5 receives an NSR catalyst which is composed of a honeycomb structured body covered with a coat layer such as alumina, a precious metal (platinum, palladium, rhodium, etc.) supported by the coat layer, and an NOx occlusion or storage agent (barium, lithium, etc.) supported by the coat layer.

The third catalyst casing 6 is arranged in the exhaust passage 3 at the downstream side of the second catalyst casing 5. The third catalyst casing 6 receives a selective reduction catalyst (SCR catalyst) which is composed of a honeycomb structured body made of cordierite or Fe—Cr—Al based heat resisting steel, an alumina or zeolite based coat layer covering the honeycomb structured body, and a precious metal (platinum, palladium, etc.) supported by the coat layer.

An ECU 7 is provided in combination with the internal combustion engine 1 as constructed in this manner. The ECU 7 is an electronic control unit which is composed of a CPU, a ROM, a RAM, a backup RAM, and so on. The ECU 7 is electrically connected to various kinds of sensors such as an air fuel ratio sensor (A/F sensor) 8, an oxygen concentration sensor (oxygen sensor) 9, a first temperature sensor 10, a first NOx sensor 11, a second NOx sensor 12, a second temperature sensor 13, an accelerator position sensor 14, a crank position sensor 15, an air flow meter 16, and so on.

The air fuel ratio sensor 8 is mounted on the exhaust passage 3 at a location upstream of the first catalyst casing 4, and outputs an electric signal correlated with an air fuel ratio of the exhaust gas which flows into the first catalyst casing 4. The oxygen concentration sensor 9 is mounted on the exhaust passage 3 at a location between the first catalyst casing 4 and the second catalyst casing 5, and outputs an electric signal correlated with a concentration of oxygen contained in the exhaust gas which flows out from the first catalyst casing 4. The first temperature sensor 10 is mounted on the exhaust passage 3 at a location between the second catalyst casing 5 and the third catalyst casing 6, and outputs an electric signal correlated with a temperature of the exhaust gas which flows out from the second catalyst casing 5. The first NOx sensor 11 is mounted on the exhaust passage 3 at a location between the second catalyst casing 5 and the third catalyst casing 6, and outputs an electric signal (a concentration of NOx) correlated with an amount of NOx (an amount of inflowing NOx) contained in the exhaust gas which flows out from the second catalyst casing 5 (i.e., the exhaust gas which flows into the third catalyst casing 6). The second NOx sensor 12 is mounted on the exhaust passage 3 at a location downstream of the third catalyst casing 6, and outputs an electric signal (a concentration of NOx) correlated with an amount of NOx (an amount of outflowing NOx) contained in the exhaust gas which flows out from the third catalyst casing 6. The second temperature sensor 13 is mounted on the exhaust passage 3 at a location downstream of the third catalyst casing 6, and outputs an electric signal correlated with a temperature of the exhaust gas which flows out from the third catalyst casing 6. The accelerator position sensor 14 outputs an electric signal correlated with an amount of operation of an accelerator pedal (i.e., a degree of opening of an accelerator). The crank position sensor 15 outputs an electric signal correlated with a rotational position of an output shaft (crankshaft) of the internal combustion engine 1. The air flow meter 16 outputs an electric signal correlated with an amount of air (i.e., an amount of intake air) sucked into the cylinder of the internal combustion engine 1. Here, note that the first NOx sensor 11 corresponds to a first measuring unit of a measuring device according to the present invention. In addition, the second NOx sensor 12 corresponds to a second measuring unit of the measuring device according to the present invention.

The ECU 7 controls the operating state of the internal combustion engine 1 based on the output signals of the above-mentioned variety of kinds of sensors. For example, the ECU 7 calculates a target value (a target air fuel ratio) of an air fuel ratio (an engine air fuel ratio) of a mixture to be supplied to the internal combustion engine 1 based on an engine rotational speed, which is calculated based on the output signal of the crank position sensor 15, and the output signal of the accelerator position sensor 14 (the accelerator opening degree). The ECU 7 calculates a target amount of fuel injection (a fuel injection period) of the fuel injection valve 2 based on the target air fuel ratio and the output signal of the air flow meter 16 (the amount of intake air), and operates the fuel injection valve 2 according to the target amount of fuel injection thus calculated.

In cases where the operating state of the internal combustion engine 1 is in a low rotation and low load region or in a middle rotation and middle load region, the ECU 7 sets the target air fuel ratio to a lean air fuel ratio which is higher than the stoichiometric air fuel ratio. In addition, in cases where the operating state of the internal combustion engine 1 is in a high load region or a high rotation region, the ECU 7 sets the target air fuel ratio to the stoichiometric air fuel ratio or a rich air fuel ratio which is lower than the stoichiometric air fuel ratio.

Thus, when the operating state of the internal combustion engine 1 belongs to the low rotation and low load region or the middle rotation and middle load region (hereinafter, these operating regions being referred to as a "lean operating region"), if the internal combustion engine 1 is operated in a lean burn state, the amount of fuel consumption will be able to be suppressed to a low level.

Here, note that the ECU 7 also carries out air fuel ratio feedback control in which the target amount of fuel injection is corrected so that the output signal of the air fuel ratio sensor 8 coincides with the above-mentioned target air fuel ratio, learning control of correction coefficients used for the air fuel ratio feedback control based on the output signal of the oxygen concentration sensor 9, etc.

However, in cases where the target air fuel ratio is set to a lean air fuel ratio, the NOx purification (removal) performance of the three-way catalyst received in the first catalyst casing 4 becomes low. For that reason, in cases where the target air fuel ratio is set to the lean air fuel ratio, it is necessary to remove or reduce NOx in the exhaust gas by means of the NSR catalyst of the second catalyst casing 5, and the SCR catalyst of the third catalyst casing 6.

The NSR catalyst adsorbs or stores NOx in the exhaust gas, when the exhaust gas flowing into the second catalyst casing 5 is in an oxygen surplus state (i.e., when the air fuel ratio of the exhaust gas is lean). When the oxygen concentration of the exhaust gas flowing into the second catalyst casing 5 is low, and when the concentration of reducing components such as hydrocarbon (HC), carbon monoxide (CO), etc., contained in the exhaust gas is high, the NSR catalyst releases the NOx stored therein, and at the same time, causes the NOx thus released to be reduced to nitrogen ($N_2$).

Here, note that the NOx storage capacity of the NSR catalyst is limited, and hence, the amount of NOx which can be adsorbed or stored by the NSR catalyst decreases as the storage amount of NOx in the NSR catalyst increases. Then, when the amount of NOx which can be occluded or stored by the NSR catalyst becomes small with respect to the amount of NOx which flows into the NSR catalyst, a part of the NOx which has flowed into the NSR catalyst is discharged, without being adsorbed or stored into the NSR catalyst (a breakthrough state). When the storage amount of NOx in the NSR catalyst further increases, the NOx storage capacity of the NSR catalyst will be saturated (i.e., the amount of NOx able to be adsorbed or stored by the NSR catalyst will become zero), almost all the amount of NOx having flowed into the NSR catalyst will be discharged, without being adsorbed or stored into the NSR catalyst.

Accordingly, before the NSR catalyst begins to carry out a breakthrough, it is necessary to reduce the NOx stored in the NSR catalyst, and to regenerate the NOx storage capacity thereof. On the other hand, in the above-mentioned lean operating region, the ECU 7 appropriately carries out the processing (rich spike processing) of changing the engine air fuel ratio to a predetermined rich air fuel ratio (hereinafter, referred to as an "air fuel ratio for regeneration") which is lower than the stoichiometric air fuel ratio. Specifically, the ECU 7 carries out at least one of the following processings: that is, the processing of increasing the amount of fuel injection of the fuel injection valve 2, and the processing of decreasing the degree of opening of an intake throttle valve (a throttle valve). When such rich spike processing is carried out, the concentration of oxygen in the exhaust gas will become low, and the concentration of HC or CO will become high. As a result, the NOx stored in the NSR catalyst desorbs from the NSR catalyst, and reacts with reducing components such as HC, CO, etc., contained in the exhaust gas, so that it is reduced to nitrogen ($N_2$).

The above-mentioned rich spike processing need only be carried out, when the storage amount of NOx in the NSR catalyst becomes equal to or larger than a fixed amount, or when the operation time of the internal combustion engine 1 from the end time of the last rich spike processing (preferably, the operation time in which the target air fuel ratio has been set to the lean air fuel ratio) becomes equal to or more than a fixed period of time, or when the travel distance of a vehicle, on which the internal combustion engine 1 is mounted, from the end time of the last rich spike processing (preferably, the travel distance within which the target air fuel ratio has been set to the lean air fuel ratio) becomes equal to or more than a fixed distance. Here, note that in this embodiment, it is assumed that rich spike processing is carried out when the storage amount of NOx in the NRC catalyst becomes equal to or larger than the fixed amount. The "fixed amount" referred to herein is an amount which is smaller than a storage amount of NOx in the NSR catalyst at the time when the normal NSR catalyst begins to carry out a breakthrough, and is an amount which has been beforehand set by adaptation processing making use of experiments, etc. (hereinafter, referred to as a "determination value for regeneration").

In addition, sulfur oxides (SOx) contained in the exhaust gas may be adsorbed or occluded (stored) in the NSR catalyst. When the amount of SOx adsorbed or stored in the NSR catalyst increases, the NOx storage capacity of the NSR catalyst will decrease accordingly. Therefore, when the amount of SOx adsorbed or stored in the NSR catalyst becomes equal to or larger than a predetermined poisoning determination value, the ECU 7 carries out processing (S regeneration processing) of oxidizing and removing the SOx adsorbed or stored in the NSR catalyst, by making the NSR catalyst into a high temperature and fuel rich atmosphere.

Subsequently, the SCR catalyst adsorbs ammonia ($NH_3$) contained in the exhaust gas. The SCR catalyst reduces NOx to nitrogen ($N_2$) by causing the $NH_3$ adsorbed to the SCR catalyst and the NOx in the exhaust gas to react with each other. $NH_3$ to be supplied to the SCR catalyst is generated in the three-way catalyst or the NSR catalyst. For example, in cases where the rich spike processing is carried out, in the three-way catalyst, a part of NOx therein is reduced to $NH_3$, and in the NSR catalyst, a part of NOx having desorbed from the NSR catalyst is reduced to $NH_3$.

Here, note that the amount of $NH_3$ generated in the NSR catalyst changes according to the interval in which the rich spike processing is carried out, the engine air fuel ratio at the time when the rich spike processing is carried out, etc. Accordingly, in cases where it is necessary to supply $NH_3$ to the SCR catalyst, the interval of execution of the rich spike processing need only be set to an interval suitable for generation of $NH_3$, or the engine air fuel ratio in the course of the execution of the rich spike processing need only be set to an air fuel ratio (e.g., 14.1 or therearound) suitable for generation of $NH_3$.

However, when there occurs an abnormality in which the NOx reduction performance of the NSR catalyst decreases, there will be a possibility that the amount of NOx discharged into ambient atmospheric air may increase. For that reason, in cases where the abnormality of the NSR catalyst has occurred, it is necessary to detect such an abnormality in a quick manner, so that the driver of the vehicle can be prompted to repair the NSR catalyst, or the lean burn operation (or lean operation) of the internal combustion engine 1 can be inhibited.

(Abnormality Diagnostic Method for NSR Catalyst)

Here, a method of diagnosing the abnormality of the NSR catalyst will be described. FIG. 2 is a view showing the changes over time of the integrated value of the amount of NOx flowing into the NSR catalyst and the amount of NOx flowing out from the NSR catalyst per unit time, in cases where the engine air fuel ratio is set to the lean air fuel ratio (i.e., in cases where the operating state of the internal combustion engine 1 belongs to the above-mentioned lean operating region. A solid line in FIG. 2 shows the change over time of the amount of NOx flowing out from the NSR catalyst per unit time in the case where the NSR catalyst is normal, and an alternate long and short dash line in FIG. 2 shows the change over time of the amount of NOx flowing out from the NSR catalyst per unit time in the case where the NSR catalyst is abnormal. Here, note that the two changes over time shown in FIG. 2 are measured under the same condition. In addition, it is assumed that the storage amount of NOx in the NSR catalyst at a time point t0 in FIG. 2 is zero.

In FIG. 2, a breakthrough timing (t1 in FIG. 2) of the NSR catalyst in the case of the NSR catalyst being abnormal becomes earlier than a breakthrough timing (t2 in FIG. 2) of the NSR catalyst in the case of the NSR catalyst being normal. For that reason, the amount of NOx flowing out from the NSR catalyst at time point t2 in FIG. 2 becomes larger in the case of the NSR catalyst being abnormal than in the case of the NSR catalyst being normal. For that reason, the integrated value of the amount of NOx flowing out from the NSR catalyst in a period of time from t0 to t2 in FIG. 2 becomes larger in the case of the NSR catalyst being abnormal than in the case of the NSR catalyst being normal.

Accordingly, in the case where it is assumed that the NSR catalyst is normal, the abnormality of the NSR catalyst can be diagnosed by starting the integration of the amount of NOx flowing into the NSR catalyst from the end time of rich spike processing or S regeneration processing, and using, as a parameter, the measured value of the first NOx sensor 11 at a time point (i.e., the NSR diagnostic time) at which the integrated value (the total amount of inflowing NOx) reaches a predetermined amount.

For example, when the measured value of the first NOx sensor 11 at the NSR diagnostic time is larger than a normal value (i.e., a maximum value which can be taken by the measured value of the first NOx sensor 11 at the NSR diagnostic time, or a value which is obtained by adding a margin to the maximum value, in the case where it is assumed that the NSR catalyst is normal), a diagnosis can be made that the NSR catalyst is abnormal. In addition, the measured value of the first NOx sensor 11 in a period of time from the end time of rich spike processing or the end time of S regeneration processing to the above-mentioned NSR diagnostic time is integrated, and when the integrated value of the measured value of the first NOx sensor 11 (i.e., the total amount of outflowing NOx) thus obtained is larger than a normal value thereof (i.e., a maximum value which can be taken by the total amount of outflowing NOx, or an amount which is obtained by adding a margin to the maximum value, in the case of the NSR catalyst being normal), a diagnosis can be made that the NSR catalyst is abnormal. Further, when a ratio of the total amount of outflowing NOx to the above-mentioned predetermined amount is larger than a normal value thereof (i.e., a maximum value which can be taken by the ratio of the total amount of outflowing NOx to the above-mentioned amount, or a value which is obtained by adding a margin to the maximum value, in the case where it is assumed that the NSR catalyst is normal), a diagnosis can be made that the NSR catalyst is abnormal. The "predetermined amount" referred to herein is a total amount of inflowing NOx at the time when the normal NSR catalyst begins to carry out a breakthrough, or an amount which is obtained by subtracting a margin from the total amount of inflowing NOx, and is larger than the above-mentioned determination value for regeneration.

However, when the abnormality diagnostic processing (the NSR diagnostic processing) of the NSR catalyst is carried out by means of the method as mentioned above, the storage amount of NOx in the NSR catalyst at the NSR diagnostic time will become larger than the above-mentioned determination value for regeneration, and hence, it is necessary to carry out the processing of regenerating the NOx storage capacity of the NSR catalyst early after the NSR diagnostic time. Accordingly, in this embodiment, the processing of regenerating the NOx storage capacity of the NSR catalyst (the regeneration processing for NSR diagnosis) is carried out by setting the engine air fuel ratio after the NSR diagnostic time to the air fuel ratio for regeneration. Here, note that in the following, rich spike processing or S regeneration processing, which is carried out at times other than at the NSR diagnostic time, is referred to as ordinary regeneration processing.

When the engine air fuel ratio is changed from the lean air fuel ratio (e.g., 20 to 25), which is suitable for the operating state of the internal combustion engine 1, to the air fuel ratio for regeneration (e.g., 12 to 14), which is suitable for the regeneration of the NOx storage capacity of the NSR catalyst, at the time when the regeneration processing for NSR diagnosis is started, there will be a possibility that the torque of the internal combustion engine may increase in a rapid manner. For that reason, it is necessary to take some countermeasure such as the decreasing of the amount of intake air, the retardation of ignition timing, etc.

Here, FIG. 3 shows changes over time of the engine air fuel ratio, the amount of intake air, and the ignition timing, in the case where the regeneration processing for NSR diagnosis has been carried out. A regeneration flag for NSR diagnosis in FIG. 3 is a flag which is turned on at the NSR diagnostic time and turned off at the end time of the regeneration processing for NSR diagnosis. As shown in FIG. 3, when the regeneration flag for NSR diagnosis is changed from off to on at the NSR diagnostic time (t3 in FIG. 3), the regeneration processing for NSR diagnosis will be started. Immediately after the start of the regeneration processing for NSR diagnosis (i.e., in a period of time from t3 to t4 in FIG. 3), a response delay of the amount of intake air occurs, so an actual amount of intake air becomes larger than a target amount of intake air. For that reason, in a period of time in which the actual amount of intake air exceeds the target amount of intake air, it is necessary to retard the ignition timing to a large extent. However, when the ignition timing is retarded to a large extent, there will be a possibility that the operating state of the internal combustion engine 1 may become unstable. Accordingly, an amount of retardation of the ignition timing is limited to equal to or less than an upper limit value (retardation limit) which has been set in advance. When the amount of retardation of the ignition timing is limited to equal to or less than the upper limit value, there will be a possibility that it may become unable to suppress the fluctuation of torque of the internal combustion engine 1 immediately after the start of the regeneration processing for NSR diagnosis.

To cope with this, a method is considered in which when the regeneration processing for NSR diagnosis is started, the engine air fuel ratio is first set to a weak rich air fuel ratio which is higher than the air fuel ratio for regeneration and is lower than the stoichiometric air fuel ratio, and then, the engine air fuel ratio is decreased from the weak rich air fuel ratio to the air fuel ratio for regeneration. However, in cases where the engine air fuel ratio is set to the weak rich air fuel ratio, the amount of unburnt fuel components contained in the exhaust gas is small, so that a part of NOx having desorbed from the NSR catalyst may not be reduced.

In addition, in the case where the NSR diagnostic processing is carried out, when the ordinary regeneration processing is carried out in the course of the period of time from the end time of the ordinary regeneration processing to the NSR diagnostic time, the diagnostic accuracy of the NSR diagnostic processing will decrease, and hence, the execution of the ordinary regeneration processing is inhibited during that period of time. However, in the period of time from the end time of the ordinary regeneration processing to the NSR diagnostic time, when the engine air fuel ratio is set to a lean air fuel ratio (basic lean air fuel ratio) suitable for an operating condition of the internal combustion engine 1 (required output power), the amount of NOx to be discharged from the internal combustion engine 1 per unit time may become small. In such a case, there will be a large possibility that before the total amount of inflowing NOx in the NSR catalyst reaches the above-mentioned predetermined amount, the operating state of the internal combustion engine 1 may deviate from the lean operating region, and accordingly, there will also be a large possibility that the NSR diagnostic processing may be interrupted or stopped. Thus, when the NSR diagnostic processing is interrupted or stopped, it becomes impossible to detect the abnormality of the NSR catalyst in a quick manner.

(Control Method for Engine Air Fuel Ratio in the Case of Execution of NSR Diagnostic Processing)

Accordingly, in this embodiment, in the case where the NSR diagnostic processing is carried out, the execution of the ordinary regeneration processing is inhibited in a period of time from the end time of the ordinary regeneration processing to the NSR diagnostic time, and the engine air fuel ratio during that period of time is set to a weak lean air fuel ratio, which is lower than the basic lean air fuel ratio and higher than the stoichiometric air fuel ratio. Here, note that when the weak lean air fuel ratio is set to a value approximate to the stoichiometric air fuel ratio, the NOx stored in the NSR catalyst may desorb therefrom. Accordingly, it is assumed that the weak lean air fuel ratio, in addition to being lower than the basic lean air fuel ratio and higher than the stoichiometric air fuel ratio, is set to an air fuel ratio (e.g., about 16 to 17) at which NOx does not desorb from the NSR catalyst.

Here, reference will be made to a control method for an engine air fuel ratio at the time of the NSR diagnostic processing being carried out, in line with a timing chart of FIG. 4. An NSR diagnostic flag in FIG. 4 is turned on when the operating state of the internal combustion engine 1 belongs to the lean operating region, and at the same time when the ordinary regeneration processing ended, whereas it is turned off when the total amount of inflowing NOx from a time point at which the NSR diagnostic flag was turned on reached the above-mentioned predetermined amount (i.e., at the NSR diagnostic time). An ordinary regeneration flag in FIG. 4 is turned on when the operating state of the internal combustion engine 1 belongs to the lean operating region, and at the same time when the amount of NOx stored in the NSR catalyst reached equal to or larger than the above-mentioned determination value for regeneration, whereas it is turned off when it is estimated that the storage amount of NOx in the NSR catalyst became zero.

In FIG. 4, in a period of time from a time point (t5 in FIG. 4) at which the NSR diagnostic flag was turned on (i.e., the ordinary regeneration flag was turned off) to a time point (t6 in FIG. 4) at which the NSR diagnostic flag is turned off (i.e., the regeneration flag for NSR diagnosis is turned on), the engine air fuel ratio is set to the weak lean air fuel ratio which is lower than the basic lean air fuel ratio and higher than the stoichiometric air fuel ratio.

In cases where the engine air fuel ratio has been set to the weak lean air fuel ratio, the amount of NOx to be discharged from the internal combustion engine 1 becomes large, in comparison with the case where the engine air fuel ratio has been set to the basic lean air fuel ratio. As a result, the period of time from the end time of the ordinary regeneration processing to the NSR diagnostic time is shortened. Therefore, there will be a small possibility that before the total amount of inflowing NOx in the NSR catalyst reaches the predetermined amount, the operating state of the internal combustion engine 1 may deviate from the lean operating region, and accordingly, there will also be a small possibility that the NSR diagnostic processing may be interrupted or stopped.

Moreover, when the NSR diagnostic flag has been changed over from on to off, the regeneration flag for NSR diagnosis is also changed over from off to on, whereby regeneration processing for NSR diagnosis is started. When the regeneration processing for NSR diagnosis is started, the engine air fuel ratio will be changed over from the weak lean air fuel ratio to an air fuel ratio for regeneration. At that time, because the weak lean air fuel ratio has been set to be lower than the basic lean air fuel ratio, the fluctuation of torque at the time of the engine air fuel ratio being changed from the weak lean air fuel ratio to the air fuel ratio for regeneration becomes smaller than the fluctuation of torque at the time of the engine air fuel ratio being changed from the basic lean air fuel ratio to the air fuel ratio for regeneration. As a result, even in cases where a response delay of the amount of intake air has occurred, it becomes possible to suppress the fluctuation of torque, while suppressing the amount of retardation of the ignition timing to equal to or less than the upper limit value.

(Execution Procedure for NSR Diagnostic Processing and Control Procedure for Engine Air Fuel Ratio)

Hereinafter, reference will be made to an execution procedure for the NSR diagnostic processing and a control procedure for the engine air fuel ratio in this embodiment, in line with FIGS. 5, 6. First, the execution procedure for the NSR diagnostic processing will be described in line with FIG. 5. FIG. 5 is a flow chart which shows a processing routine carried out by the ECU 7 at the time when the NSR diagnostic processing is performed. The processing routine of FIG. 5 has been stored in the ROM of the ECU 7 in advance, and is carried out by means of the ECU 7 (CPU) when the ordinary regeneration processing has been ended. Here, note that a diagnostic unit according to the present invention is achieved by carrying out the processing routine of FIG. 5 by means of the ECU 7.

In the processing routine of FIG. 5, first in step S101, the ECU 7 determines whether the operating state of the internal combustion engine 1 belongs to the lean operating region. In cases where an affirmative determination is made in the processing of step S101, the routine of the ECU 7 goes to the processing of step S102, where the NSR diagnostic flag is turned on.

In the processing of step S103, the ECU 7 calculates a total amount of NOx (a total amount of inflowing NOx) SUMAnsrin which has flowed into the NSR catalyst until the current point in time from the end time of the ordinary regeneration processing. Specifically, the ECU 7 estimates an amount of NOx flowing into the NSR catalyst per unit time (an amount of inflowing NOx Ansrin), and integrates the estimated value thus obtained. Here, the amount of NOx flowing into the NSR catalyst per unit time may also be calculated from a measured value of an NOx sensor, which is arranged in the exhaust passage 3 at a location upstream of the first catalyst casing 4, and the amount of intake air. In addition, the amount of NOx flowing into the NSR catalyst per unit time may also be calculated by using an operating condition of the internal combustion engine 1 (e.g., an engine rotational speed, a load factor, etc.) as a parameter.

In the processing of step S104, the ECU 7 determines whether the total amount of inflowing NOx SUMAnsrin is equal to or larger than a predetermined amount A1. The "predetermined amount" referred to herein is equivalent to a total amount of inflowing NOx at the time when the normal NSR catalyst begins to carry out a breakthrough, or an amount which is obtained by subtracting a margin from the total amount of inflowing NOx, and is larger than the above-mentioned determination value for regeneration.

In cases where a negative determination is made in the processing of step S104 (SUMAnsrin<A1), the routine of the ECU 7 returns to the processing of step S101. On the other hand, in cases where an affirmative determination is made in the processing of step S104 ('SUMAnsrin' is not less than 'A1'), the routine of the ECU 7 goes to the processing of step S105. In the processing of step S105, a measured value Ansrout of the first NOx sensor 11 (an amount of outflowing NOx) is read in. This amount of outflowing NOx Ansrout corresponds to an amount of NOx flowing out from the NSR catalyst at the NSR diagnostic time.

In the processing of step S106, the ECU 7 determines whether the amount of outgoing NOx Ansrout read in by the processing of the above-mentioned step S105 is equal to or less than a normal value Thre1. The "normal value Thre1" referred to herein is a maximum value which can be taken by the measured value of the first NOx sensor 11 at the NSR diagnostic time, or a value which is obtained by adding a margin to the maximum value, in the case where it is assumed that the NSR catalyst is normal.

In cases where an affirmative determination is made in the processing of step S106 ('Ansrout' is not more than 'Thre1'), the routine of the ECU 7 returns to the processing of step S107, where a determination is made that the NSR catalyst is normal. On the other hand, in cases where a negative determination is made in the processing of step S106 (Ansrout>Thre1), the routine of the ECU 7 goes to the processing of step S108, where a determination is made that the NSR catalyst is abnormal.

After the execution of the processing of step S107 or S108, the routine of the ECU 7 goes to the processing of step S109, where the NSR diagnostic flag is turned off. Here, note that in cases where the engine air fuel ratio has been set to the stoichiometric air fuel ratio or a rich air fuel ratio after the end of the ordinary regeneration processing, or in cases where the operating state of the internal combustion engine 1 has deviated from the lean operating region in the middle of the period of time from the end time of the ordinary regeneration processing to the NSR diagnostic time so that the engine air fuel ratio has been set to the stoichiometric air fuel ratio or a rich air fuel ratio, a negative determination will be made in the processing of the above-mentioned step S101. Then, the routine of the ECU 7 goes to the processing of step S109, where the NSR diagnostic flag is turned off. In that case, the NSR diagnostic processing will not be carried out, or the NSR diagnostic processing will be stopped.

Next, reference will be made to the control procedure for the engine air fuel ratio in the case of the NSR diagnostic processing being carried out, in line with FIG. 6. FIG. 6 is a flow chart showing a processing routine which is executed by the ECU 7 in the case where the engine air fuel ratio at the time of the NSR diagnostic processing being carried out is controlled. This processing routine has been stored in the ROM of the ECU 7 in advance, and is carried out by means of the ECU 7 (CPU) at the time when the above-mentioned NSR diagnostic flag has been changed over from off to on. Here, note that a control unit according to the present invention is achieved by carrying out the processing routine of FIG. 6 by means of the ECU 7.

In the processing routine of FIG. 6, first in the processing of step S201, the ECU 7 determines whether the operating state of the internal combustion engine 1 belongs to the lean operating region. In cases where an affirmative determination is made in the processing of step S201, the routine of the ECU 7 goes to the processing of step S202, where the engine air fuel ratio is set to a weak lean air fuel ratio which is lower than the basic lean air fuel ratio and higher than the stoichiometric air fuel ratio.

In the processing of step S203, the ECU 7 reads in the total amount of inflowing NOx SUMAnsrin calculated in the above-mentioned processing routine of FIG. 5. Subsequently, in the processing of step S204, the ECU 7 determines whether the total amount of inflowing NOx SUMAnsrin thus read in by the above-mentioned processing of step S203 is equal to or larger than the predetermined amount A1.

In cases where a negative determination is made in the processing of step S204 (SUMAnsrin<A1), the routine of the ECU 7 returns to the processing of step S201. On the other hand, in cases where an affirmative determination is made in the processing of step S204 ('SUMAnsrin' is not less than 'A1'), the routine of the ECU 7 goes to the processing of step S205.

In the processing of step S205, the ECU 7 turns on the regeneration flag for NSR diagnosis. Subsequently, in the processing of step S206, the ECU 7 carries out the regeneration processing for NSR diagnosis. Specifically, the ECU 7 changes the engine air fuel ratio from the weak lean air fuel ratio to a rich air fuel ratio (an air fuel ratio for regeneration) which is suitable for the regeneration of the NOx storage capacity of the NSR catalyst.

In the processing of step S207, the ECU 7 determines whether the regeneration of the NSR catalyst ended. At that time, when it is estimated that the storage amount of NOx in the NSR catalyst became zero, the ECU 7 may make a determination that the regeneration of the NSR catalyst ended. For example, the ECU 7 estimates the amount of NOx to be reduced per unit time, based on an amount of reducing components (HC or CO) supplied to the NSR catalyst per unit time, and integrates the estimated value thus obtained. Then, the ECU 7 need only obtain the storage amount of NOx in the NSR catalyst by subtracting the integrated value from the storage amount of NOx.

In cases where a negative determination is made in the processing of the above-mentioned step S207, the routine of the ECU 7 returns to the processing of step S206. On the other hand, in cases where an affirmative determination is made in the processing of the above-mentioned step S207, the routine of the ECU 7 goes to the processing of step S208, where the regeneration flag for NSR diagnosis is turned off. Here, note that in cases where the operating state of the internal combustion engine 1 has deviated from the lean operating region in the middle of the period of time from the end time of the ordinary regeneration processing to the NSR diagnostic time, a negative determination will be made in the processing of the above-mentioned step S101. In that case, too, the routine of the ECU 7 goes to the processing of step S208, where the regeneration flag for NSR diagnosis is turned off.

As stated above, when the ECU 7 carries out the processing routine of FIG. 6, the engine air fuel ratio in the period of time from the end time of the ordinary regeneration processing to the NSR diagnostic time is set to the weak lean air fuel ratio which is lower than the basic lean air fuel ratio, so that a period of time to be taken until the total amount of inflowing NOx in the NSR catalyst SUMAnsrin reaches the predetermined amount A1 is shortened. Accordingly, there is a small possibility that the NSR diagnostic processing will be interrupted or stopped before the total amount of inflowing NOx in the NSR catalyst SUMAnsrin reaches the predetermined amount A1. In addition, the amount of change of the engine air fuel ratio at the time of the regeneration processing for NSR diagnosis being started becomes small, so that even in cases where the response delay of the amount of intake air has occurred, it also becomes possible to suppress the fluctuation of torque in the internal combustion engine 1, without making an amount of retardation of ignition timing excessively large. As a result, it becomes possible to detect the abnormality of the NSR catalyst in a quick manner, while suppressing the fluctuation of torque of the internal combustion engine 1 at the time of the regeneration processing for NSR diagnosis being started.

Here, note that in the processing routine of FIG. 6, the execution timing of the regeneration processing for NSR diagnosis, in other words, the timing at which the engine air fuel ratio is changed over from the weak lean air fuel ratio to the rich air fuel ratio, is specified based on the total amount of inflowing NOx SUMAnsrin, but the above-mentioned change-over timing may be specified based on the operation period of time of the internal combustion engine 1 from the end time of the ordinary regeneration processing. For example, when the operation period of time from the end time of the ordinary regeneration processing reaches a predetermined period of time, the processing of regenerating the NOx storage capacity of the NSR catalyst may be started. The predetermined period of time in that case corresponds to the period of time to be required for the total amount of inflowing NOx SUMAnsrin to reach the predetermined amount A1.

Second Embodiment

Next, reference will be made to a second embodiment of the present invention based on FIGS. 7 through 9. Here, a construction different from that of the above-mentioned first embodiment will be described, and an explanation of the same construction will be omitted.

In the above-mentioned first embodiment, an example has been described in which the engine air fuel ratio in the case of the NSR diagnostic processing being carried out is controlled, but in this second embodiment, there will be described an example in which the engine air fuel ratio in the case of diagnosing the abnormality of the SCR catalyst is controlled.

(Abnormality Diagnostic Method for SCR Catalyst)

As a method of diagnosing the abnormality of the SCR catalyst, there can be considered a method in which an NOx purification (reduction) rate of the SCR catalyst (i.e., a ratio of an amount of NOx being reduced by the SCR catalyst with respect to the amount of NOx flowing into the SCR catalyst) is calculated by using, as parameters, an amount of NOx flowing into the SCR catalyst per unit time and an amount of NOx flowing out from the SCR catalyst per unit time, and when the NOx reduction rate thus obtained is smaller than a normal value thereof (i.e., a minimum value which can be taken by the NOx reduction rate of the normal SCR catalyst, or a value which is obtained by subtracting a margin from the minimum value), a diagnosis can be made that the SCR catalyst is abnormal.

However, in the construction in which the NSR catalyst is arranged at the upstream side of the SCR catalyst, an amount of NOx flowing into the SCR catalyst per unit time becomes extremely small. On the other hand, the measured values of the first NOx sensor 11 and the second NOx sensor 12 may each contain a variation and an error. For that reason, when the NOx reduction rate of the SCR catalyst is calculated by making use of the measured values of the first NOx sensor 11 and the second NOx sensor 12, at the time the amount of NOx flowing into the SCR catalyst per unit time is small, the NOx reduction rate of the SCR catalyst may become smaller than its normal value, in spite of the fact that the SCR catalyst is normal.

As a result, it is desirable to calculate the NOx reduction rate of the SCR catalyst based on the measured values of the first NOx sensor 11 and the second NOx sensor 12 at the time of the NSR catalyst being in a breakthrough state. Accordingly, in this second embodiment, the execution of the ordinary regeneration processing and the regeneration processing for NSR diagnosis is inhibited in a period of time from the end time of the normal regeneration processing until a time point (an SCR diagnostic time) at which the above-mentioned total amount of inflowing NOx reaches a second predetermined amount which is larger than the above-mentioned predetermined amount (hereinafter, referred to as a "first predetermined amount"). Then, the NOx reduction rate of the SCR catalyst is calculated by making use of the measured value of the first NOx sensor 11 and the measured value of the second NOx sensor 12 at the SCR diagnostic time. Specifically, the NOx reduction rate of the SCR catalyst may be calculated by making use of only the measured values of the first NOx sensor 11 and the second NOx sensor 12 at the SCR diagnostic time as parameters. In addition, by using, as parameters, the measured values of the first NOx sensor 11 and the second NOx sensor 12 in a period of time from a time point corresponding to the above-mentioned NSR diagnostic time to the above-mentioned SCR diagnostic time, including the measured values of the first NOx sensor 11 and the second NOx sensor 12 at the SCR diagnostic time, an integrated value of an amount of NOx having flowed into the SCR catalyst and an integrated value of an amount of NOx having flowed out from the SCR catalyst in the same period of time may be calculated, and the NOx reduction rate of the SCR catalyst may be calculated from those integrated values thus obtained.

Here, in the case of the NSR catalyst being normal, an integrated value of an amount of NOx flowing into the SCR catalyst in a period of time until the total amount of inflowing NOx in the NSR catalyst reaches the first predetermined amount becomes substantially zero. Then, when the total amount of inflowing NOx in the NSR catalyst exceeds the first predetermined amount, the NSR catalyst comes into the breakthrough state, so that the amount of NOx flowing into the SCR catalyst per unit time increases. On the other hand, in the case of the NSR catalyst being abnormal, the NSR catalyst becomes a breakthrough before the total amount of inflowing NOx in the NSR catalyst reaches the first predetermined amount, and hence, after the total amount of inflowing NOx in the NSR catalyst exceeded the first predetermined amount, the amount of NOx flowing into the SCR catalyst per unit time is sure to increase.

Accordingly, in a period of time after the total amount of inflowing NOx in the NSR catalyst reaches the first predetermined amount until it reaches the second predetermined amount, the amount of NOx flowing into the SCR catalyst per unit time increases, and the integrated value of the amount of NOx flowing into the SCR catalyst also accordingly becomes large to a sufficient extent in the same period of time. As a result, even in cases where a variation or an error is included in the measured values of the first NOx sensor 11 and the second NOx sensor 12, it becomes possible to diagnose the abnormality of the SCR catalyst in a more accurate manner.

However, when SCR diagnostic processing is carried out by means of the method as mentioned above, the NSR catalyst becomes the breakthrough state, and hence, it is necessary to carry out the processing of regenerating the NOx storage capacity of the NSR catalyst early after the SCR diagnostic time. Accordingly, in this second embodiment, the processing of regenerating the NOx storage capacity of the NSR catalyst (regeneration processing for SCR diagnosis) is carried out by setting the engine air fuel ratio after the SCR diagnostic time to a rich air fuel ratio.

When the engine air fuel ratio is changed over from the basic lean air fuel ratio to an air fuel ratio for regeneration at the time the regeneration processing for SCR diagnosis is started, there will be a possibility that the fluctuation of torque in the internal combustion engine 1 can not be suppressed. Accordingly, when the engine air fuel ratio is set to the basic lean air fuel ratio in the period of time from the end time of the ordinary regeneration processing to the SCR diagnostic time, the period of time required for the total amount of inflowing NOx to become equal to or more than the above-mentioned second predetermined amount becomes long, so that the possibility that the SCR diagnostic processing will be interrupted or stopped becomes large. As a result, it may be possible that the abnormality of the NSR catalyst can not be detected in a quick manner.

(Control Method for Engine Air Fuel Ratio in the Case of Execution of SCR Diagnostic Processing)

Accordingly, in this second embodiment, in the case where the SCR diagnostic processing is carried out, the execution of the ordinary regeneration processing is inhibited in the period of time from the end time of the ordinary regeneration processing to the SCR diagnostic time, and the engine air fuel ratio during that period of time is set to a weak lean air fuel ratio. It is assumed that the "weak lean air fuel ratio" referred to herein, in addition to being lower than the basic lean air fuel ratio and higher than the stoichiometric air fuel ratio, is set to an air fuel ratio (e.g., about 16 to 17) at which NOx does not desorb from the NSR catalyst, as in the above-mentioned case where the NSR diagnostic processing is carried out.

Here, reference will be made to a control method for an engine air fuel ratio at the time of the SCR diagnostic processing being carried out, in line with a timing chart of FIG. 7. An SCR diagnostic flag in FIG. 7 is turned on when the operating state of the internal combustion engine 1 belongs to the lean operating region, and at the same time when the ordinary regeneration processing ended, whereas it is turned off when an integrated value of the amount of NOx flowing into the NSR catalyst (a total amount of inflowing NOx) from a time point at which the SCR diagnostic flag was turned on reached the above-mentioned second predetermined amount (i.e., at the SCR diagnostic time). In addition, a regeneration flag for SCR diagnosis is a flag which is turned on at the SCR diagnostic time and turned off at the end time of the regeneration processing for SCR diagnosis (i.e., at the time when it is estimated that the storage amount of NOx in the NSR catalyst is zero).

In FIG. 7, in a period of time from a time point (t5 in FIG. 7) at which the SCR diagnostic flag was turned on (i.e., the ordinary regeneration flag was turned off) to a time point (t7 in FIG. 7) at which the SCR diagnostic flag is turned off (i.e., the regeneration flag for SCR diagnosis is turned on), the engine air fuel ratio is set to the weak lean air fuel ratio. As a result, the period of time from the end time of the ordinary regeneration processing to the SCR diagnostic time is shortened. Therefore, there will be a small possibility that before the total amount of inflowing NOx in the NSR catalyst reaches the second predetermined amount, the operating state of the internal combustion engine 1 may deviate from the lean operating region, and accordingly, there will also be a small possibility that the SCR diagnostic processing may be interrupted or stopped.

Moreover, when the SCR diagnostic flag is changed over from on to off by the total amount of inflowing NOx in the NSR catalyst becoming equal to or more than the second predetermined amount, the regeneration flag for SCR diagnosis is also changed over from off to on, whereby regeneration processing for SCR diagnosis is started. When the regeneration processing for SCR diagnosis is started, the engine air fuel ratio will be changed over from the weak lean air fuel ratio to an air fuel ratio for regeneration. As a result, the fluctuation of torque in the internal combustion engine 1 can be suppressed, as in the case where the regeneration processing for NSR diagnosis is carried out.

(Execution Procedure for SCR Diagnostic Processing and Control Procedure for Engine Air Fuel Ratio)

Hereinafter, reference will be made to an execution procedure for the SCR diagnostic processing and a control procedure for the engine air fuel ratio in this second embodiment, in line with FIGS. 8, 9. First, the execution procedure for the SCR diagnostic processing will be described in line with FIG. 8. FIG. 8 is a flow chart which shows a processing routine carried out by the ECU 7 at the time when the SCR diagnostic processing is performed. The processing routine of FIG. 8 has been stored in the ROM of the ECU 7 in advance, and is carried out by means of the ECU 7 (CPU) when the ordinary regeneration processing has been ended.

In the processing routine of FIG. 8, first in the processing of step S301, the ECU 7 determines whether an amount of $NH_3$ having been adsorbed to the SCR catalyst (an amount of adsorption of $NH_3$) is equal to or more than a specified amount. The "specified amount" referred to herein is, for example, an amount which is obtained by subtracting a predetermined margin from a maximum amount of $NH_3$ that can be adsorbed by the SCR catalyst (i.e., an amount of $NH_3$ adsorption at the time when an $NH_3$ adsorption rate and an $NH_3$ desorption rate of the SCR catalyst is in an equilibrium state).

In cases where an affirmative determination is made in the processing of the above-mentioned step S301, the routine of the ECU 7 goes to step S302, where it is determined whether the operating state of the internal combustion engine 1 belongs to the lean operating region. In cases where an affirmative determination is made in the processing of step S302, the routine of the ECU 7 goes to the processing of step S303, where the SCR diagnostic flag is turned on.

In the processing of step S304, the ECU 7 calculates a total amount of inflowing NOx SUMAnsrin. The total amount of inflowing NOx SUMAnsrin is calculated by means of the same method as the processing of step S103 in the above-mentioned processing routine of the FIG. 5. Subsequently, in the processing of S305, the ECU 7 determines whether the total amount of inflowing NOx SUMAnsrin thus calculated in the above-mentioned processing of step S304 is equal to or larger than a first predetermined amount A1.

In cases where a negative determination is made in the processing of step S305 (SUMAnsrin<A1), the routine of the ECU 7 returns to the processing of step S302. On the other hand, in cases where an affirmative determination is made in the processing of step S305 ('SUMAnsrin' is not less than 'A1'), the routine of the ECU 7 goes to the processing of step S306. In the processing of step S306, the ECU 7 calculates an integrated value SUMAscrin of the amount of NOx flowing into the SCR catalyst (the amount of inflowing NOx), and an integrated value SUMAscrout of the amount of NOx flowing out from the SCR catalyst (the amount of outgoing NOx). Specifically, the ECU 7 first calculates the amount of NOx flowing into the SCR catalyst per unit time from the measured value of the first NOx sensor 11 and the measured value of the air flow meter 16, and then calculates the above-mentioned integrated value SUMAscrin by integrating the calculated value thus obtained. Also, the ECU 7 first calculates the amount of NOx flowing out from the SCR catalyst per unit time from the measured value of the second NOx sensor 12 and the measured value of the air flow meter 16, and then calculates the above-mentioned integrated value SUMAscrout by integrating the calculated value thus obtained.

In the processing of step S307, the ECU 7 determines whether the total amount of inflowing NOx SUMAnsrin calculated in the above-mentioned processing of step S304 is equal to or larger than a second predetermined amount A2. The "second predetermined amount A2" referred to herein is an amount which is larger than the above-mentioned first predetermined amount A1, and is also larger than a total amount of inflowing NOx in the NSR catalyst at the time when the normal NSR catalyst begins to carry out a breakthrough. In cases where a negative determination is made in the processing of step S307 (SUMAnsrin<A2), the routine of the ECU 7 returns to the processing of step S302. On the other hand, in cases where an affirmative determination is made in the processing of step S307 ('SUMAnsrin' is not less than 'A2'), the routine of the ECU 7 goes to the processing of step S308.

In the processing of step S308, the NOx reduction rate of the SCR catalyst Esnox (=1−(SUMAscrout/SUMAscrin)) is calculated by using the integrated values SUMAscrin and SUMAscrout calculated in the above-mentioned processing of step S306.

In the processing of step S309, the ECU 7 determines whether the reduction rate Esnox calculated in the above-mentioned processing of step S308 is equal to or more than a normal value Thre2. The "normal value Thre2" referred to herein is a minimum value which can be taken by the NOx reduction rate Esnox, or a value which is obtained by subtracting a margin from the minimum value, in the case where it is assumed that the SCR catalyst is normal.

In cases where an affirmative determination is made in the processing of the above-mentioned step S309 ('Esnox' is not less than 'Thre2'), the routine of the ECU 7 goes to the processing of step S310, where a determination is made that the SCR catalyst is normal. On the other hand, in cases where a negative determination is made in the processing of the above-mentioned step S309 (Esnox<Thre2), the routine of the ECU 7 goes to the processing of step S311, where a determination is made that the SCR catalyst is abnormal.

After the execution of the processing of the above-mentioned step S310 or S311, the routine of the ECU 7 goes to the processing of step S312, where the SCR diagnostic flag is turned off. Here, note that in cases where a negative determination is made in the processing of the above-mentioned step S301 or S302, too, the routine of the ECU 7 goes to the processing of step S312, where the SCR diagnostic flag is turned off. In that case, the SCR diagnostic processing will not be carried out, or the SCR diagnostic processing will be stopped.

Next, reference will be made to the control procedure for the engine air fuel ratio in the case of the SCR diagnostic processing being carried out, in line with FIG. 9. FIG. 9 is a flow chart showing a processing routine which is executed by the ECU 7 in the case where the engine air fuel ratio at the time of the SCR diagnostic processing being carried out is controlled. This processing routine has been stored in the ROM of the ECU 7 in advance, and is carried out by means of the ECU 7 (CPU) at the time when the above-mentioned SCR diagnostic flag has been changed over from off to on.

In the processing routine of FIG. 9, the processings of steps S401 through S402 are the same as the processings of steps S201 through S202 in the above-mentioned processing routine of FIG. 6. In the processing of step S403, the ECU 7 reads in the total amount of inflowing NOx SUMAnsrin calculated in the above-mentioned processing routine of FIG. 8. Subsequently, the ECU 7 goes to the processing of step S404, where it is determined whether the total amount of inflowing NOx SUMAnsrin thus read in by the above-mentioned processing of step S403 is equal to or larger than the second predetermined amount A2.

In cases where a negative determination is made in the processing of step S404 (SUMAnsrin<A2), the routine of the ECU 7 returns to the processing of step S401. On the other hand, in cases where an affirmative determination is made in the processing of step S404 ('SUMAnsrin' is not less than 'A2'), the routine of the ECU 7 goes to the processing of step S405. In the processing of step S405, the ECU 7 turns on the regeneration flag for SCR diagnosis. Subsequently, in the processing of step S406, the ECU 7 carries out the regeneration processing for SCR diagnosis in such a way that the ECU 7 changes the engine air fuel ratio from the weak lean air fuel ratio to an air fuel ratio for regeneration. Here, when the SCR diagnostic processing is carried out, the amount of $NH_3$ adsorption of the SCR catalyst decreases, and so, the air fuel ratio for regeneration set in the processing of step S406 may be set to an air fuel ratio suitable for generation of $NH_3$ (e.g., about 14). In the processing of step S407, the ECU 7 determines whether the regeneration of the SCR catalyst ended. In cases where a negative determination is made in the processing of the above-mentioned step S407, the routine of the ECU 7 returns to the processing of step S406. On the other hand, in cases where an affirmative determination is made in the processing of the above-mentioned step S407, the routine of the ECU 7 goes to the processing of step S408, where the regeneration flag for SCR diagnosis is turned off.

As stated above, when the ECU 7 carries out the processing routine of FIG. 9, the engine air fuel ratio in the period of time from the end time of the ordinary regeneration processing to the SCR diagnostic time is set to the weak lean air fuel ratio which is lower than the basic lean air fuel ratio, so that a period of time to be taken until the total amount of inflowing NOx in the NSR catalyst SUMAnsrin reaches the second predetermined amount A2 is shortened. Accordingly, there is a small possibility that the SCR diagnostic processing will be interrupted or stopped before the total amount of inflowing NOx in the NSR catalyst SUMAnsrin reaches the predetermined amount A2. In addition, at the time when the regeneration processing for SCR diagnosis is started, an amount of change of the engine air fuel ratio becomes small, so it becomes possible to suppress the fluctuation of torque in the internal combustion engine 1. As a result, it becomes possible to detect the abnormality of the SCR catalyst in a quick manner, while suppressing the fluctuation of torque of the internal combustion engine 1 at the time of the regeneration processing for SCR diagnosis being started.

Third Embodiment

Next, reference will be made to a third embodiment of the present invention based on FIGS. 10 through 11. Here, a construction different from that of the above-mentioned first embodiment will be described, and an explanation of the same construction will be omitted.

In the above-mentioned first embodiment, there has been described an example in which the engine air fuel ratio is set to the weak lean air fuel ratio in the entire period from the end time of the ordinary regeneration processing to the NSR diagnostic time. On the other hand, in this third embodiment, an example will be described in which the engine air fuel ratio is set to the weak lean air fuel ratio only in a part of the period of time from the end time of the ordinary regeneration processing to the NSR diagnostic time.

FIG. 10 is a timing chart showing a control method for an engine air fuel ratio in the case where NSR diagnostic processing is carried out in the third embodiment of the present invention. In FIG. 10, in a period of time (i.e., a period of time from t5 to t51 in FIG. 10) from the time when a time point at which the ordinary regeneration processing ended (i.e., the time when the ordinary regeneration flag was turned off, and the NSR diagnostic flag was turned on) to a time point at which the total amount of inflowing NOx in the NSR catalyst reaches a threshold value (i.e., an amount which is obtained by subtracting a fixed amount a0 from the first predetermined amount A1), the engine air fuel ratio is set to the basic lean air fuel ratio. Then, in a period of time (i.e., a period of time from t51 to t6 in FIG. 10) from the time point (weak lean operation start time) at which the total amount of inflowing NOx in the NSR catalyst reached the above-mentioned threshold value to the NSR diagnostic time, the engine air fuel ratio is set to a weak lean air fuel ratio.

In addition, in the case where the engine air fuel ratio is set to the weak lean air fuel ratio, the amount of fuel consumption of the internal combustion engine 1 becomes large, in comparison with the case where the engine air fuel ratio is set to the basic lean air fuel ratio. Accordingly, when the engine air fuel ratio is set to the weak lean air fuel ratio in the entire period of time from the end time of the ordinary regeneration processing to the NSR diagnostic time, there is a possibility that the amount of fuel consumption of the internal combustion engine 1 may become large.

On the other hand, when the engine air fuel ratio is set to the weak lean air fuel ratio only in a part of the period of time from the weak lean operation start time to the NSR diagnostic time, among the period of time from the end time of the ordinary regeneration processing to the NSR diagnostic time, it is possible to attain shortening of the period of time from the end time of the ordinary regeneration processing to the NSR diagnostic time as well as reduction of the fluctuation of torque at the time of the regeneration processing for NSR diagnosis being started, while suppressing an increase in the amount of fuel consumption to be small.

Hereinafter, reference will be made to a control procedure for the engine air fuel ratio in this third embodiment, in line with FIG. 11. FIG. 11 is a flow chart which shows a processing routine carried out by the ECU 7 in the case where the NSR diagnostic processing is performed. In FIG. 11, the same symbols are attached to the same processings as those in the above-mentioned processing routine of FIG. 6.

In the processing routine of FIG. 11, the ECU 7 carries out the processing of step S203 after the execution of the processing of S201. Subsequently, the ECU 7 carries out the processing of step S501 after the execution of the processing of step S203. In the processing of step S501, the ECU 7 determines whether the total amount of inflowing NOx SUMAnsrin read in by the processing of step S203 is equal to or larger than a threshold value. The "threshold value" referred to herein is an amount (A1−a0) which is obtained by subtracting the fixed amount a0 from the first predetermined amount A1, as referred to above.

In cases where a negative determination is made in the processing of step S501 (SUMAnsrin<(A1−a0)), the routine of the ECU 7 goes to the processing of step S503. In the processing of step S503, the ECU 7 sets the engine air fuel ratio to the basic lean air fuel ratio. The routine of the ECU 7 returns to the processing of step S201 after the execution of the processing of step S503.

On the other hand, in cases where an affirmative determination is made in the processing of step S501 ('SUMAnsrin' is not less than '(A1−a0)'), the routine of the ECU 7 goes to the processing of step S502, where the engine air fuel ratio is set to the weak lean air fuel ratio. The ECU 7 carries out the processings of steps S204 through S208 after the execution of the processing of step S502.

When the ECU 7 controls the engine air fuel ratio according to the processing routine of FIG. 11, it is possible to attain shortening of the period of time to be taken by the NSR diagnostic processing as well as reduction of the fluctuation of torque at the time of the regeneration processing for NSR diagnosis being started, while suppressing an increase in the amount of fuel consumption to be small.

Here, note that in the case where the SCR diagnostic processing is carried out as described in the above-mentioned second embodiment, the same effects or advantages as in this third embodiment can be obtained by replacing the first predetermined amount A1 in the processings of S501 and S204 in FIG. 11 with the second predetermined amount A2.

Fourth Embodiment

Next, reference will be made to a fourth embodiment of the present invention based on FIGS. 12 through 14. Here, a construction different from that of the above-mentioned third embodiment will be described, and an explanation of the same construction will be omitted.

In the third embodiment, there has been described an example in which will be described in which the engine air fuel ratio is set to the weak lean air fuel ratio, within the period of time from the end time of the ordinary regeneration processing to the NSR diagnostic time, in particular only in a part thereof immediately before the NSR diagnostic time. On the other hand, in this fourth embodiment, an example will be described in which the engine air fuel ratio is set to the weak lean air fuel ratio, in a period of time in which the temperature of the NSR catalyst is less than a predetermined temperature, too, in addition to only in a part of the period of time from the end time of the ordinary regeneration processing to the NSR diagnostic time immediately before the NSR diagnostic time.

FIG. 12 is a view showing the relation between the temperature of the NSR catalyst and the NOx reduction rate of the NSR catalyst. The NOx reduction rate of the NSR catalyst is a ratio of an amount of NOx, which is reduced in the NSR catalyst, with respect to a total sum of an amount of the NOx stored in the NSR catalyst and an amount of NOx flowing into the NSR catalyst, at the time when the air fuel ratio of the exhaust gas flowing into the NSR catalyst is a rich air fuel ratio. As shown in FIG. 12, when the temperature of the NSR catalyst is lower than a predetermined temperature Tnsrmin, the actual NOx reduction rate becomes smaller with respect to a lower limit value of the NOx reduction rate required of the NSR catalyst. Accordingly, when regeneration processing for NSR diagnosis is carried out at the time the temperature of the NSR catalyst is lower than the predetermined temperature Tnsrmin, there will be a possibility that a part of NOx having desorbed from the NSR catalyst, or a part of NOx having flowed into the NSR catalyst, may no longer be reduced. Here, note that even in cases where the temperature of the NSR catalyst is lower than the predetermined temperature Tnsrmin, the NSR catalyst can store NOx in the exhaust gas. Accordingly, the NOx reduction ability of the NSR catalyst need only be activated before the total amount of inflowing NOx reaches the first predetermined amount (i.e., before the regeneration processing for NSR diagnosis is started).

Accordingly, in this fourth embodiment, as shown in FIG. 13, in a period of time (i.e., a period of time from t52 to t53 in FIG. 13) in which the temperature of the NSR catalyst becomes less than the predetermined temperature Tnsrmin, among a period of time (i.e., a period of time from t5 to t51 in FIG. 13) from the end time of the ordinary regeneration processing (i.e., a time point at which the NSR diagnostic flag was turned on) to the weak lean operation start time (i.e., a time point at which the total amount of inflowing NOx reaches the threshold value), the engine air fuel ratio is set to the weak lean air fuel ratio.

Here, the relation between the engine air fuel ratio and the temperature of the NSR catalyst in the fourth embodiment of the present invention is shown in FIG. 14. As shown in FIG. 14, when the engine air fuel ratio is low, the temperature of the NSR catalyst becomes high, in comparison with when the engine air fuel ratio is high. For that reason, in cases where the engine air fuel ratio is set to the weak lean air fuel ratio, the temperature of the NSR catalyst becomes high, in comparison with the case where the engine air fuel ratio is set to the basic lean air fuel ratio. Accordingly, when the engine air fuel ratio is set to the weak lean air fuel ratio at the time the temperature of the NSR catalyst is less than the predetermined temperature Tnsrmin, the temperature of the NSR catalyst can be raised. As a result, it becomes possible to make the temperature of the NSR catalyst at the time of the regeneration processing for NSR diagnosis being started equal to or higher than the predetermined temperature Tnsrmin.

Hereinafter, reference will be made to a control procedure for the engine air fuel ratio in the case of abnormality diagnostic processing for the NSR catalyst in this fourth embodiment, in line with FIG. 15. FIG. 15 is a flow chart showing a processing routine which is executed by the ECU 7 in the case where the engine air fuel ratio at the time of the NSR diagnostic processing being carried out is controlled. In FIG. 15, the same symbols are attached to the same processings as those in the above-mentioned processing routine of FIG. 11.

In the processing routine of FIG. 15, the ECU 7 carries out the processing of step S601 after having performed the processing of step S203. In the processing of step S601, the ECU 7 determines whether the temperature Tnsr of the NSR catalyst (i.e., the measured value of the first temperature sensor 10) is equal to or larger than the predetermined temperature Tnsrmin.

In cases where an affirmative determination is made in the processing of step S601 ('Tnsr' is not less than 'Tnsrmin'), the routine of the ECU 7 goes to the processing of step S501. On the other hand, in cases where a negative determination is made in the processing of step S601 (Tnsr<Tnsrmin), the routine of the ECU 10 goes to the processing of step S602. In the processing of step S602, the ECU 7 sets the engine air fuel ratio to the weak lean air fuel ratio. The routine of the ECU 7 returns to the processing of step S201 after the execution of the processing of step S602.

When the ECU 7 controls the engine air fuel ratio according to the processing routine of FIG. 15, the same effects or advantages as those in the above-mentioned third embodiment can be obtained, and at the same time, the NOx reduction rate of the NSR catalyst at the time of the regeneration processing for NSR diagnosis being carried out can be enhanced in a reliable manner.

Here, note that in the case where the SCR diagnostic processing is carried out as described in the above-mentioned second embodiment, it is required that the NOx reduction performance of the SCR catalyst in addition to the NOx reduction performance of the NSR catalyst have been made active. This is because when the SCR diagnostic processing is carried out at the time the NOx purification performance of the SCR catalyst has not been made active, an incorrect determination may be made that the SCR catalyst is abnormal, in spite of the fact that the SCR catalyst is normal.

Accordingly, in this fourth embodiment, as shown in FIG. 16, in a period of time (i.e., a period of time from t54 to t55 in FIG. 16) including both a period of time in which the temperature of the NSR catalyst becomes less than the predetermined temperature Tnsrmin, and a period of time in which the temperature of the SCR catalyst becomes less than a predetermined temperature Tscrmin, among a period of time (i.e., a period of time from t5 to t51 in FIG. 16) from the end time of the ordinary regeneration processing (i.e., a time point at which the SCR diagnostic flag was turned on) to the weak lean operation start time (i.e., a time point at which the total amount of inflowing NOx reaches a threshold value (an amount which is obtained by subtracting a predetermined amount from the second predetermined amount)), the engine air fuel ratio is set to the weak lean air fuel ratio. The predetermined temperature Tscrmin is a minimum (lowest) temperature at which the NOx reduction rate of the SCR catalyst becomes equal to or larger than a lower limit value of the NOx reduction rate required of the SCR catalyst.

Hereinafter, reference will be made to a control procedure for the engine air fuel ratio in the case of the SCR diagnostic processing being carried out in this fourth embodiment, in line with FIG. 17. FIG. 17 is a flow chart showing a processing routine which is executed by the ECU 7 in the case where the engine air fuel ratio at the time of the SCR diagnostic processing being carried out is controlled. In FIG. 17, the same symbols are attached to the same processings as those in the above-mentioned processing routine of FIG. 9.

In the control routine of FIG. 17, in cases where an affirmative determination is made in the processing of step S401, the ECU 7 carries out the processing of step S403, and subsequently carries out the processing of step S701. In the processing of step S701, the ECU 7 determines whether the temperature Tnsr of the NSR catalyst (i.e., the measured value of the first temperature sensor 10) is equal to or larger than the predetermined temperature Tnsrmin.

In cases where an affirmative determination is made in the processing of step S701 ('Tnsr' is not less than 'Tnsrmin'), the routine of the ECU 7 goes to the processing of step S702, where it is determined whether the temperature Tscr of the SCR catalyst (i.e., the measured value of the second temperature sensor 13) is equal to or larger than the predetermined temperature Tscrmin.

In cases where a negative determination is made in the processing of step S701 (Tnsr<Tnsrmin), or in cases where a negative determination is made in the processing of step S702 (Tscr<Tscrmin), the routine of the ECU 7 goes to the processing of step S706. In the processing of step S706, the ECU 7 sets the engine air fuel ratio to the weak lean air fuel ratio. The routine of the ECU 7 returns to the processing of step S401 after the execution of the processing of step S706.

In cases where an affirmative determination is made in the processing of step S702 ('Tscr' is not less than 'Tscrmin'), the routine of the ECU 7 goes to the processing of step S703. In the processing of step S703, the ECU 7 determines whether the total amount of inflowing NOx SUMAnsrin in the NSR catalyst calculated is equal to or larger than a threshold value (i.e., an amount which is obtained by subtracting a predetermined amount a0 from a second predetermined amount A2).

In cases where a negative determination is made in the processing of step S703 (SUMAnsrin<(A2-a0)), the routine of the ECU 7 goes to the processing of step S705, where the engine air fuel ratio is set to the basic lean air fuel ratio. The routine of the ECU 7 returns to the processing of step S401 after the execution of the processing of step S705. On the other hand, in cases where an affirmative determination is made in the processing of step S703 ('SUMAnsrin' is not less than ' (A2-a0)'), the routine of the ECU 7 goes to the processing of step S704, where the engine air fuel ratio is set to the weak lean air fuel ratio. The ECU 7 carries out the processings of steps S404 through S408 in a sequential manner after the execution of the processing of step S704.

When the ECU 7 controls the engine air fuel ratio according to the processing routine of FIG. 17, the NOx reduction rate of the NSR catalyst at the time of the regeneration processing for SCR diagnosis being carried out can be enhanced, and at the same time, the diagnostic accuracy of the SCR diagnostic processing can also be enhanced.

Fifth Embodiment

Next, reference will be made to a fifth embodiment of the present invention based on FIG. 18. Here, a construction different from those of the above-mentioned first through fourth embodiments will be described, and an explanation of the same construction will be omitted.

In the above-mentioned first through fourth embodiments, there has been described an example in which the engine air fuel ratio in at least a part of the period of time before the regeneration processing for NSR diagnosis or the regeneration processing for SCR diagnosis is started is set to an air fuel ratio (i.e., weak lean air fuel ratio) which is lower than the basic lean air fuel ratio and higher than the stoichiometric air fuel ratio, but in this fifth embodiment, an example will be described in which the engine air fuel ratio immediately before the start of the ordinary regeneration processing is set to an air fuel ratio (an intermediate air fuel ratio) which is lower than the basic lean air fuel ratio and higher than the stoichiometric air fuel ratio.

When the engine air fuel ratio is changed over from the basic lean air fuel ratio to the air fuel ratio for regeneration at the time the ordinary regeneration processing is started, the fluctuation of torque in the internal combustion engine 1 may become large. Accordingly, in this fifth embodiment, the engine air fuel ratio before the start of the ordinary regeneration processing is set to an intermediate air fuel ratio which is lower than the basic lean air fuel ratio and higher than the stoichiometric air fuel ratio.

Specifically, as shown in FIG. 18, the ECU 7 changes over the engine air fuel ratio from the basic lean air fuel ratio to the intermediate air fuel ratio, at a predetermined time point (t21 in FIG. 18) which is after the end time of the last ordinary regeneration processing (t10 in FIG. 18) and before the start time of the current ordinary regeneration processing (t20 in FIG. 18). Then, at the time point (t20 in FIG. 18) at which the current ordinary regeneration processing is started, the ECU 7 changes over the engine air fuel ratio from the intermediate air fuel ratio to a rich air fuel ratio.

Here, if the intermediate air fuel ratio is set to a relatively low air fuel ratio, the amount of fuel consumption may increase. Moreover, when the intermediate air fuel ratio is set to the relatively low air fuel ratio, the amount of NOx to be discharged from the internal combustion engine 1 per unit time will increase, so that the frequency of carrying out the ordinary regeneration processing may also increase. For that reason, it is desirable that the intermediate air fuel ratio be set to an air fuel ratio (e.g., about 18 to 20) which is higher than the above-mentioned weak lean air fuel ratio.

In addition, in cases where a period of time in which the engine air fuel ratio is set to the intermediate air fuel ratio (i.e., a period of time P1 from t21 to t20 in FIG. 18) is set to be long, too, an increase in the amount of fuel consumption and an increase in the frequency of carrying out the ordinary regeneration processing may be caused. For that reason, it is desirable that the length of the period of time (P1 in FIG. 18) in which the engine air fuel ratio is set to the intermediate air fuel ratio be set to be shorter than a period of time (a period of time P2 from t51 to t6 in FIG. 18) in which the engine air fuel ratio is set to the weak lean air fuel ratio, as described in the above-mentioned third embodiment. Specifically, in the case where the ordinary regeneration processing is carried out at the time when the integrated value of the amount of NOx having flowed into the NSR catalyst from the end time of the last ordinary regeneration processing reaches the aforementioned determination value for regeneration, the engine air fuel ratio should be changed over from the basic lean air fuel ratio to the intermediate air fuel ratio at the time when the above-mentioned integrated value of the amount of inflowing NOx reached a third predetermined amount which is smaller than the determination value for regeneration, and a difference between the determination value for regeneration and the third predetermined amount should be set to be smaller than a difference between the above-mentioned threshold value (i.e., the value which is obtained by subtracting the fixed amount a0 from the above-mentioned first predetermined amount A1 or the above-mentioned second predetermined amount A2) and the first predetermined amount or the second predetermined amount.

According to the fifth embodiment described above, it is possible to suppress small the fluctuation of torque of the internal combustion engine 1 at the time of the ordinary regeneration processing being started, too, in addition to the fluctuation of torque of the internal combustion engine 1 at the time of the regeneration processing for NSR diagnosis or the regeneration processing for SCR diagnosis being started. Moreover, it is also possible to suppress small an increase in the amount of fuel consumption as well as an increase in the frequency of carrying out the ordinary regeneration processing, resulting from the engine air fuel ratio being set to the intermediate air fuel ratio.

Other Embodiments

In cases where an automatic transmission is mounted on the vehicle with the internal combustion engine 1 mounted thereon, there is a possibility that the timing at which the regeneration processing for NSR diagnosis or the regeneration processing for SCR diagnosis is started may overlap with a speed change (gear shift) period of the automatic transmission. In such a case, a shift shock may become excessive, and may give a strange or uncomfortable feeling to the driver of the vehicle.

On the other hand, there can be considered a method in which in cases where the operating state of the internal combustion engine 1 is approximate to a shift point of the automatic transmission, the regeneration processing for NSR diagnosis and the regeneration processing for SCR diagnosis are inhibited. However, when the regeneration processing for NSR diagnosis or the regeneration processing for SCR diagnosis is carried out, the storage amount of NOx in the NSR catalyst will be approximate to a breakthrough storage amount, or the NSR catalyst will be in a breakthrough state. In such a case, if the regeneration processing for NSR diagnosis and the regeneration processing for SCR diagnosis are inhibited, deterioration of exhaust emissions may be caused.

Accordingly, in a further embodiment, when the regeneration processing for NSR diagnosis or the regeneration processing for SCR diagnosis is carried out, a shift operation of the automatic transmission is inhibited. For example, in cases where the regeneration processing for NSR diagnosis or the regeneration processing for SCR diagnosis overlaps with the shift operation of the automatic transmission, the ECU 7 sends a request for inhibiting a shift operation to an ECU for the automatic transmission. According to such a method, it is possible to avoid an increase in shift shock, while suppressing an increase in harmful exhaust emissions. In addition, in cases where the timing at which the ordinary regeneration processing is started overlaps with the speed change (gear shift) period of the automatic transmission, too, the shift operation of the automatic transmission may be inhibited. In that case, it is possible to suppress small the fluctuation of torque of the internal combustion engine 1 at the time of the ordinary regeneration processing being started, too, in addition to the fluctuation of torque of the internal combustion engine 1 at the time of the regeneration processing for NSR diagnosis or the regeneration processing for SCR diagnosis being started.

Here, note that in above-mentioned first through fifth embodiments, a construction in which the NSR catalyst and the SCR catalyst are arranged in the exhaust passage 3 of the internal combustion engine 1 has been mentioned as an example. However, a control method for an engine air fuel ratio, which is performed in cases where the NSR diagnostic processing is carried out in the first and third through fifth embodiments, can also be applied to a construction in which only the NSR catalyst is arranged in the exhaust passage 3 of the internal combustion engine 1.

REFERENCE SIGNS LIST

1 internal combustion engine
2 fuel injection valve
3 exhaust passage
4 first catalyst casing
5 second catalyst casing
6 third catalyst casing
7 ECU
8 air fuel ratio sensor
9 oxygen concentration sensor
10 first temperature sensor
11 first NOx sensor
12 second NOx sensor
13 second temperature sensor

The invention claimed is:

1. A control apparatus for an internal combustion engine in which an exhaust gas purification device including an NOx storage reduction (NSR) catalyst and a measuring device for measuring an amount of NOx flowing out from said NSR catalyst are arranged in an exhaust passage, comprising:
a regeneration unit configured to carry out regeneration processing which is processing of regenerating the NOx storage capacity of said NSR catalyst;

a diagnostic unit configured to carry out NSR diagnostic processing which is processing of diagnosing an abnormality in said NSR catalyst, based on a measured value of said measuring device at a predetermined NSR diagnostic time after said regeneration processing ended; and a control unit configured to control an engine air fuel ratio which is an air fuel ratio of a mixture to be supplied to said internal combustion engine;

wherein in cases where said NSR diagnostic processing is carried out, said control unit controls, in a period of time from a predetermined weak lean operation start time after an end time of said regeneration processing to said NSR diagnostic time, the engine air fuel ratio to a weak lean air fuel ratio which is lower than a lean air fuel ratio according to an operating condition of the internal combustion engine and which is higher than a stoichiometric air fuel ratio, and changes, after said NSR diagnostic time, the engine air fuel ratio from said weak lean air fuel ratio to a rich air fuel ratio which is lower than the stoichiometric air fuel ratio.

2. The control apparatus for an internal combustion engine as set forth in claim 1,
wherein said NSR diagnostic time is a time point at which a total amount of inflowing NOx, which is an integrated value of an amount of NOx flowing into said NSR catalyst from the end time of said regeneration processing, becomes equal to or more than a predetermined amount.

3. The control apparatus for an internal combustion engine as set forth in claim 1,
wherein said weak lean operation start time is the end time of said regeneration processing.

4. The control apparatus for an internal combustion engine as set forth in claim 2,
wherein said weak lean operation start time is a time point which is later than the end time of said regeneration processing, and at which said total amount of inflowing NOx becomes equal to a threshold value which is less than said predetermined amount; and
said control unit sets the engine air fuel ratio to the lean air fuel ratio according to the operating condition of the internal combustion engine, in a period of time from the end time of said regeneration processing to said weak lean operation start time.

5. The control apparatus for an internal combustion engine as set forth in claim 4,
wherein said control unit sets the engine air fuel ratio to said weak lean air fuel ratio in a period of time in which the temperature of said NSR catalyst becomes lower than a temperature range in which the NOx reduction ability of said NSR catalyst becomes active, among the period of time from the end time of said regeneration processing to said weak lean operation start time.

6. The control apparatus for an internal combustion engine as set forth in claim 1,
wherein said exhaust gas purification device includes an SCR catalyst that is arranged at the downstream side of said NSR catalyst;
said measuring device is equipped with a first measuring unit that measures the amount of NOx flowing out from said NSR catalyst, and a second measuring unit that measures an amount of NOx flowing out from said SCR catalyst;
in cases where it is necessary to diagnose an abnormality in said SCR catalyst, said control unit controls, in a period of time from said weak lean operation start time to a predetermined SCR diagnostic time which is later than said NSR diagnostic time, the engine air fuel ratio to the weak lean air fuel ratio which is lower than the lean air fuel ratio according to the operating condition of the internal combustion engine and which is higher than the stoichiometric air fuel ratio, and changes, after said SCR diagnostic time, the engine air fuel ratio from said weak lean air fuel ratio to a rich air fuel ratio which is lower than the stoichiometric air fuel ratio; and
said diagnostic unit carries out SCR diagnostic processing, which is processing of diagnosing an abnormality in said SCR catalyst, based on a measured value of said second measuring unit at said SCR diagnostic time.

7. The control apparatus for an internal combustion engine as set forth in claim 2,
wherein said weak lean operation start time is the end time of said regeneration processing.

8. The control apparatus for an internal combustion engine as set forth in claim 2,
wherein said exhaust gas purification device includes an SCR catalyst that is arranged at the downstream side of said NSR catalyst;
said measuring device is equipped with a first measuring unit that measures the amount of NOx flowing out from said NSR catalyst, and a second measuring unit that measures an amount of NOx flowing out from said SCR catalyst;
in cases where it is necessary to diagnose an abnormality in said SCR catalyst, said control unit controls, in a period of time from said weak lean operation start time to a predetermined SCR diagnostic time which is later than said NSR diagnostic time, the engine air fuel ratio to the weak lean air fuel ratio which is lower than the lean air fuel ratio according to the operating condition of the internal combustion engine and which is higher than the stoichiometric air fuel ratio, and changes, after said SCR diagnostic time, the engine air fuel ratio from said weak lean air fuel ratio to a rich air fuel ratio which is lower than the stoichiometric air fuel ratio; and
said diagnostic unit carries out SCR diagnostic processing, which is processing of diagnosing an abnormality in said SCR catalyst, based on a measured value of said second measuring unit at said SCR diagnostic time.

9. The control apparatus for an internal combustion engine as set forth in claim 3,
wherein said exhaust gas purification device includes an SCR catalyst that is arranged at the downstream side of said NSR catalyst;
said measuring device is equipped with a first measuring unit that measures the amount of NOx flowing out from said NSR catalyst, and a second measuring unit that measures an amount of NOx flowing out from said SCR catalyst;
in cases where it is necessary to diagnose an abnormality in said SCR catalyst, said control unit controls, in a period of time from said weak lean operation start time to a predetermined SCR diagnostic time which is later than said NSR diagnostic time, the engine air fuel ratio to the weak lean air fuel ratio which is lower than the lean air fuel ratio according to the operating condition of the internal combustion engine and which is higher than the stoichiometric air fuel ratio, and changes, after said SCR diagnostic time, the engine air fuel ratio from said weak lean air fuel ratio to a rich air fuel ratio which is lower than the stoichiometric air fuel ratio; and
said diagnostic unit carries out SCR diagnostic processing, which is processing of diagnosing an abnormality in said SCR catalyst, based on a measured value of said second measuring unit at said SCR diagnostic time.

10. The control apparatus for an internal combustion engine as set forth in claim 4,
wherein said exhaust gas purification device includes an SCR catalyst that is arranged at the downstream side of said NSR catalyst;
said measuring device is equipped with a first measuring unit that measures the amount of NOx flowing out from said NSR catalyst, and a second measuring unit that measures an amount of NOx flowing out from said SCR catalyst;
in cases where it is necessary to diagnose an abnormality in said SCR catalyst, said control unit controls, in a period of time from said weak lean operation start time to a predetermined SCR diagnostic time which is later than said NSR diagnostic time, the engine air fuel ratio to the weak lean air fuel ratio which is lower than the lean air fuel ratio according to the operating condition of the internal combustion engine and which is higher than the stoichiometric air fuel ratio, and changes, after said SCR diagnostic time, the engine air fuel ratio from said weak lean air fuel ratio to a rich air fuel ratio which is lower than the stoichiometric air fuel ratio; and
said diagnostic unit carries out SCR diagnostic processing, which is processing of diagnosing an abnormality in said SCR catalyst, based on a measured value of said second measuring unit at said SCR diagnostic time.

11. The control apparatus for an internal combustion engine as set forth in claim 5,
wherein said exhaust gas purification device includes an SCR catalyst that is arranged at the downstream side of said NSR catalyst;
said measuring device is equipped with a first measuring unit that measures the amount of NOx flowing out from said NSR catalyst, and a second measuring unit that measures an amount of NOx flowing out from said SCR catalyst;
in cases where it is necessary to diagnose an abnormality in said SCR catalyst, said control unit controls, in a period of time from said weak lean operation start time to a predetermined SCR diagnostic time which is later than said NSR diagnostic time, the engine air fuel ratio to the weak lean air fuel ratio which is lower than the lean air fuel ratio according to the operating condition of the internal combustion engine and which is higher than the stoichiometric air fuel ratio, and changes, after said SCR diagnostic time, the engine air fuel ratio from said weak lean air fuel ratio to a rich air fuel ratio which is lower than the stoichiometric air fuel ratio; and
said diagnostic unit carries out SCR diagnostic processing, which is processing of diagnosing an abnormality in said SCR catalyst, based on a measured value of said second measuring unit at said SCR diagnostic time.

12. The control apparatus for an internal combustion engine as set forth in claim 6,
wherein said exhaust gas purification device includes an SCR catalyst that is arranged at the downstream side of said NSR catalyst;
said measuring device is equipped with a first measuring unit that measures the amount of NOx flowing out from said NSR catalyst, and a second measuring unit that measures an amount of NOx flowing out from said SCR catalyst;
in cases where it is necessary to diagnose an abnormality in said SCR catalyst, said control unit controls, in a period of time from said weak lean operation start time to a predetermined SCR diagnostic time which is later than said NSR diagnostic time, the engine air fuel ratio to the weak lean air fuel ratio which is lower than the lean air fuel ratio according to the operating condition of the internal combustion engine and which is higher than the stoichiometric air fuel ratio, and changes, after said SCR diagnostic time, the engine air fuel ratio from said weak lean air fuel ratio to a rich air fuel ratio which is lower than the stoichiometric air fuel ratio; and
said diagnostic unit carries out SCR diagnostic processing, which is processing of diagnosing an abnormality in said SCR catalyst, based on a measured value of said second measuring unit at said SCR diagnostic time.

\* \* \* \* \*